United States Patent
Kurasawa et al.

(10) Patent No.: US 10,592,044 B2
(45) Date of Patent: Mar. 17, 2020

(54) DISPLAY APPARATUS

(71) Applicant: Japan Display Inc., Tokyo (JP)

(72) Inventors: Hayato Kurasawa, Tokyo (JP); Yuji Suzuki, Tokyo (JP); Hiroshi Mizuhashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/434,800

(22) Filed: Jun. 7, 2019

(65) Prior Publication Data

US 2019/0286276 A1 Sep. 19, 2019

Related U.S. Application Data

(63) Continuation of application No. 15/461,608, filed on Mar. 17, 2017, now Pat. No. 10,353,512.

(30) Foreign Application Priority Data

Mar. 23, 2016 (JP) .................. 2016-058522

(51) Int. Cl.
*G06F 3/041* (2006.01)
*G06F 3/044* (2006.01)
(Continued)

(52) U.S. Cl.
CPC ........ *G06F 3/0416* (2013.01); *G02F 1/13338* (2013.01); *G02F 1/134309* (2013.01);
(Continued)

(58) Field of Classification Search
None
See application file for complete search history.

(56) References Cited

U.S. PATENT DOCUMENTS 8,228,312 B2 7/2012 Matsubara
8,970,515 B2 3/2015 Moran et al.
(Continued)

FOREIGN PATENT DOCUMENTS

CN 103927072 A 7/2014
EP 2 772 838 B1 5/2017
(Continued)

OTHER PUBLICATIONS

Japanese Office Action dated Oct. 8, 2019, corresponding to Japanese Patent Application No. 2016-058522.

*Primary Examiner* — Nicholas J Lee
(74) *Attorney, Agent, or Firm* — Michael Best & Friedrich LLP

(57) ABSTRACT

A display apparatus capable of reducing the lowering of detection sensitivity is provided. A display apparatus provided with a pixel array having a plurality of pixels arranged in a matrix form includes: detection electrodes which are in parallel with each other, which are arranged so as to extend in a first direction, and which are connected so as to form a magnetic-field detection coil; and a detection electrode having one end which is arranged inside the magnetic-field detection coil and which is connected to the magnetic-field detection coil, and the other end which is electrically insulated from the magnetic-field detection coil. At the time of each of the magnetic field detection and the electric field detection, an external object is detected based on a change in a signal in the detection electrodes.

10 Claims, 16 Drawing Sheets

(51) Int. Cl.
*G06F 3/046* (2006.01)
*G06F 3/0354* (2013.01)
*G02F 1/1343* (2006.01)
*G02F 1/1333* (2006.01)

(52) U.S. Cl.
CPC .......... *G06F 3/03545* (2013.01); *G06F 3/044* (2013.01); *G06F 3/046* (2013.01); *G06F 3/0412* (2013.01); *G02F 2201/122* (2013.01); *G06F 2203/04106* (2013.01); *G06F 2203/04108* (2013.01); *G06F 2203/04112* (2013.01)

(56) References Cited

U.S. PATENT DOCUMENTS

| | | |
|---|---|---|
| 9,721,536 B2 | 8/2017 | Kurasawa et al. |
| 10,185,426 B2 | 1/2019 | Kurasawa et al. |
| 2007/0124515 A1 | 5/2007 | Ishikawa et al. |
| 2009/0166100 A1 | 7/2009 | Matsubara |
| 2014/0035838 A1 | 2/2014 | Yoo et al. |
| 2014/0062929 A1* | 3/2014 | Lee .......... G06F 3/046 345/173 |
| 2014/0078104 A1* | 3/2014 | Lee .......... G06F 3/044 345/174 |
| 2015/0138151 A1 | 5/2015 | Moran et al. |
| 2015/0227254 A1 | 8/2015 | Kim et al. |
| 2019/0107910 A1 | 4/2019 | Kurasawa et al. |

FOREIGN PATENT DOCUMENTS

| | | |
|---|---|---|
| JP | 2009-162538 A | 7/2009 |
| JP | 2012-519329 A | 8/2012 |
| JP | 2014-164770 A | 9/2014 |
| JP | 2015-115021 A | 6/2015 |

\* cited by examiner

DISPLAY APPARATUS

CROSS REFERENCES TO RELATED APPLICATIONS

This is a Continuation of application Ser. No. 15/461,608, filed on Mar. 17, 2017, which claims priority from Japanese Patent Application No. 2016-58522 filed on Mar. 23, 2016, the content of which is hereby incorporated by reference into this application.

TECHNICAL FIELD OF THE INVENTION

The present invention relates to a display apparatus. More particularly, the present invention relates to a display apparatus with a touch detection function capable of detecting an externally-approaching object.

BACKGROUND OF THE INVENTION

In recent years, a touch detection device which is so called touch panel capable of detecting an externally-approaching object has attracted attention. A touch panel is mounted on a display apparatus such as a liquid crystal display apparatus or integrated with a liquid crystal display apparatus so as to be provided as a display apparatus with a touch detection function.

As the externally-approaching object, a touch panel enabled to use, for example, a pen is known. By enabling the touch panel to use a pen, for example, a small area can be assigned or hand-written characters can be input. Various techniques to detect the touch by a pen are known. As one of the various techniques, an electromagnetic induction system is known. In the electromagnetic induction system, high accuracy and high handwriting pressure detection accuracy can be achieved, and a hovering detection function in a state in which an externally-approaching object is separated from the touch panel surface can be also achieved, and therefore, the system is a leading technique as the technique to detect the touch by a pen.

A touch detecting device capable of detecting a finger, etc., as the externally-approaching object is known. In this case, an object to be detected is different from the pen, and therefore, a system different from the electromagnetic induction system is employed for the touch detection technique. For example, systems of detecting optical change, resistance value change, or electric field change, caused by the finger touch, etc., are cited. As the system of detecting the electric field change among these systems, for example, an electrostatic capacitive system utilizing a capacitance is cited. This electrostatic capacitive system has a relatively simple structure and less power consumption, and therefore, is used for a portable information terminal, etc.

The technique related to the touch panel achieving both the electromagnetic induction system and the electrostatic capacitive system is described in, for example, Japanese Patent Application Laid-Open Publication No. 2009-162538 (Patent Document 1).

SUMMARY OF THE INVENTION

As the electromagnetic induction system, a system is cited, the system of mounting a coil and a capacitor on a pen, generating a magnetic field in a touch panel, charging magnetic energy in the capacitor mounted on the pen, and detecting the magnetic energy in the touch panel. This system requires a sensor plate that forms a coil for detecting the magnetic energy from the pen. When the sensor plate is mounted so as to achieve the display apparatus with the touch detection function, a price (a production cost) of the display apparatus with the touch detection function increases. Also in the case of the electrostatic capacitive system, the touch panel requires an electrostatic electrode for detecting the capacitance change. Therefore, the price increases.

The present inventors of the present application have thought that the electromagnetic induction system is suitable for the touch detection by the pen and that the electrostatic capacitive system is suitable for the touch detecting by the finger. The inventors have also thought that the sensor plate used by the electromagnetic induction system and the electrostatic electrode used by the electrostatic capacitive system are achieved by a layer in the display apparatus in order to suppress the increase in the price. In this case, the layer of the display apparatus can be effectively used by using the sensor plate forming the coil also as the electrostatic electrode. However, when the sensor plate forming the coil is used as the electrostatic electrode, it is concerned that arrangement of the electrostatic electrode has limitation, which results in deteriorating the touch detection sensitivity.

The Patent Document 1 describes the technique related to the touch panel achieving both the electromagnetic induction system and the electrostatic capacitive system. However, the usage of the coil in the electromagnetic induction system also as the electrostatic electrode is neither described nor recognized therein.

An object of the present invention is to provide a display apparatus with a touch detection function (hereinafter, also simply referred to as display apparatus) capable of suppressing reduction of detection sensitivity.

A display apparatus according to one embodiment of the present invention is provided with a pair of first electrodes, a second electrode, and a detection circuit, being in parallel with each other in a pixel array in a plan view, being arranged so as to extend in a first direction, and being electrically connected to each other, the second electrode being arranged in an area formed by the pair of first electrodes in a plan view and having one end connected to the pair of first electrodes and the other end having a gap between the other end and the pair of first electrodes, and the detection circuit being connected to one first electrode of the pair of first electrodes. Here, a coil is configured by the pair of first electrodes, so that a detection signal in accordance with a magnetic field from an external object is output to the detection circuit.

BRIEF DESCRIPTIONS OF THE DRAWINGS

DESCRIPTIONS OF THE PREFERRED EMBODIMENTS

Figure 1A:
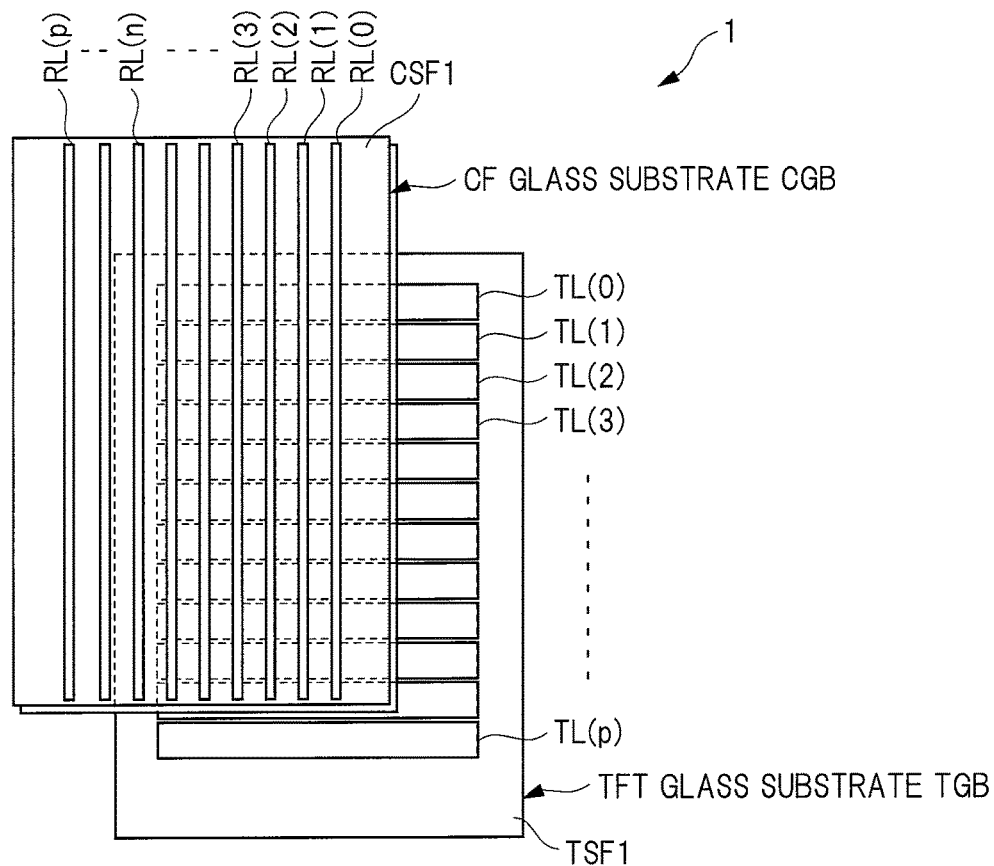
FIG. 1A and FIG. 1B are a plan view and a cross-sectional view showing a configuration of a display apparatus.

The following is explanation for each embodiment of the present invention with reference to drawings. Note that disclosure is merely one example, and appropriate change with keeping the concept of the present invention which can be easily thought up by those who skilled in the art is obviously contained in the scope of the present invention. Also, in order to make the clear description, the drawings are illustrated more schematically for a width, a thickness, a shape, and others of each portion than those in an actual aspect in some cases. However, they are merely examples, and do not limit the interpretation of the present invention.

In the present specification and each drawing, similar elements to those described earlier for the already-described drawings are denoted by the same reference characters, and detailed description for them is appropriately omitted in some cases. The following explanation will be made while a liquid crystal display apparatus with a touch detection function is exemplified as a display apparatus. However, the display apparatus is not limited to this, and an OLED display apparatus with a touch detection function or others may be applicable.

First Embodiment

First embodiment provides a liquid crystal display apparatus with a touch detection function (hereinafter, referred to also as "liquid crystal display apparatus") capable of detecting both of a touch by a pen and a touch by a finger. First, a basic configuration of a liquid crystal display apparatus will be explained, and then, a magnetic field detection for detecting the touch by a pen and an electric field touch detection for detecting the touch by a finger will be explained based on this basic configuration.

<Basic Configuration of Liquid Crystal Display Apparatus>

Figure 1B:
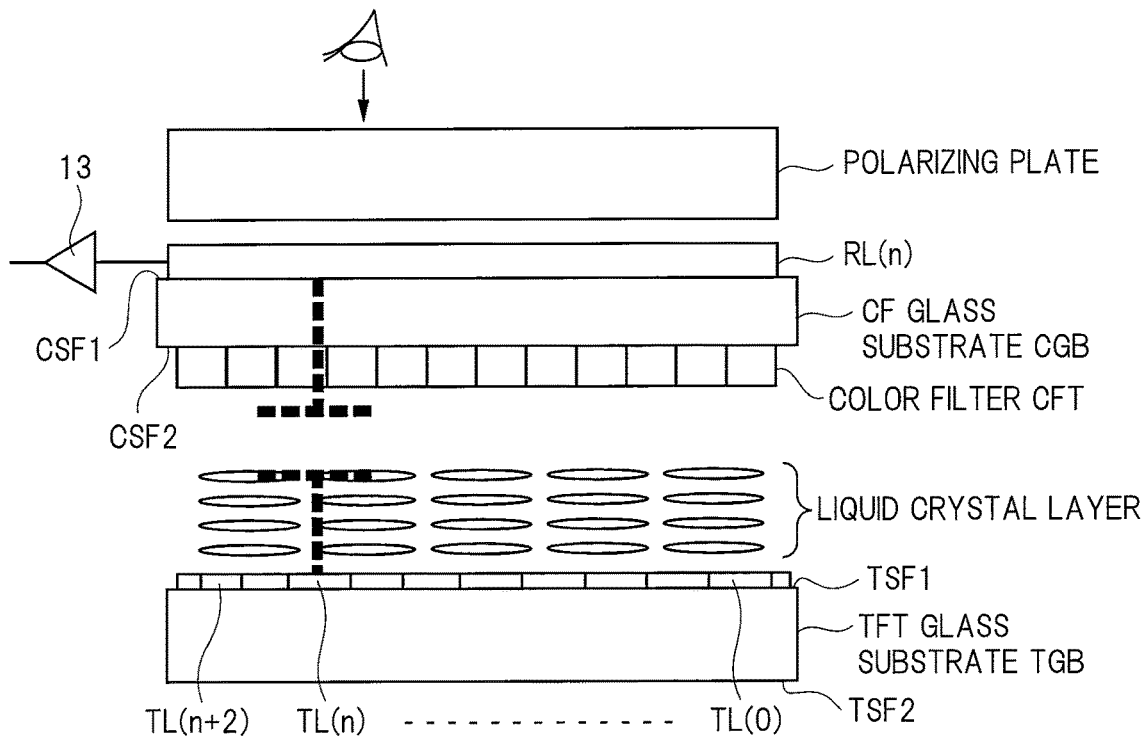

FIG. 1A and FIG. 1B are views that schematically show a configuration of a liquid crystal display apparatus. In FIG. 1A and FIG. 1B, a reference character 1 represents the liquid crystal display apparatus, FIG. 1A is a plan view showing a plane of the liquid crystal display apparatus 1, and FIG. 1B is a cross-sectional view showing a cross-section of the liquid crystal display apparatus 1. The liquid crystal display apparatus 1 is provided with a TFT (Thin Film Transistor) glass substrate (hereinafter, referred to also as "first substrate") TGB, a layer stacked on the first substrate TGB, a color filter CFT, a CF (color filter) glass substrate (hereinafter, referred to also as "second substrate") CGB, and a layer stacked on the second substrate CGB.

In FIG. 1A, reference characters TL(0) to TL(p) indicate drive electrodes configured by layers formed on a first main surface TSF1 of the first substrate TGB. Moreover, reference characters RL(0) to RL(p) indicate detection electrodes configured by layers formed on a first main surface CSF1 of the second substrate CGB. In FIG. 1A, for easiness of understanding, the first substrate TGB and the second substrate CGB are separately illustrated. However, practically, the first main surface TSF1 and the second main surface CSF2 are opposed to each other across a liquid crystal layer as shown in FIG. 1B.

A plurality of layers, the liquid crystal layer, and the like, are sandwiched between the first substrate TGB and the second substrate CGB. FIG. 1B shows only the drive electrodes TL(0) to TL(n+2), the liquid crystal layer and the color filter CFT, sandwiched between the first main surface TSF1 and the second main surface TSF2. Moreover, as shown in FIG. 1A, on the first main surface CSF1 of the second substrate CGB, the plurality of detection electrodes RL(0) to RL(p) and a polarizing plate are arranged. Furthermore, in FIG. 1B, a reference character 13 indicates a unit detection circuit connected to the detection electrode RL(n).

In the present specification, as shown in FIG. 1B, a state of the liquid crystal device 1 when viewed from the first main surface CSF1 of the second substrate CGB is explained as a plan view. When viewed as the plan view from the first main surfaces CSF1 and TSF1, the drive electrodes TL(0) to TL(p) extend in a row (horizontal) direction and are arranged in parallel with each other in a column (vertical) direction on the first main surface TSF1 as shown in FIG. 1A. Moreover, on the first main surface CSF1, the detection electrodes RL(0) to RL(p) extend in the column (vertical) direction and are arranged in parallel with each other in the row (horizontal) direction as shown in FIG. 1A.

The second substrate CGB, the liquid crystal layer and others are interposed between the drive electrodes TL(0) to TL(p) and the detection electrodes RL(0) to RL(p). For this reason, while the drive electrodes TL(0) to TL(p) and the detection electrodes RL(0) to RL(p) intersect with each other in a plan view, those electrodes are physically separated from each other. Since capacitance exists between the drive electrodes and the detection electrodes, each capacitance is shown by a broken line as a capacitive element in FIG. 1B.

In a plan view, it is desirable to dispose the drive electrodes TL(0) to TL(p) and the detection electrodes RL(0) to RL(p) so as to be orthogonal to each other. Moreover, in a plan view, the drive electrodes and the detection electrodes may intersect with each other while tilting. Therefore, in the following explanation, it should be understood that the term "being orthogonal" includes the term "intersecting".

<Principle of Magnetic Field Detection>

Figure 2A:
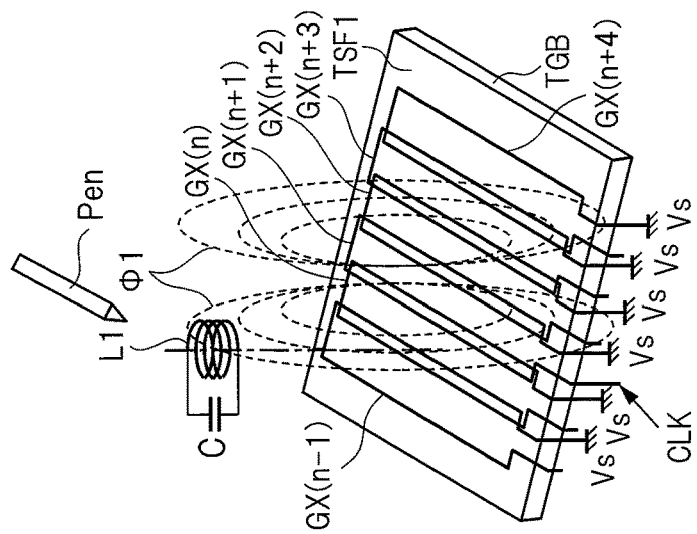
FIG. 2A to FIG. 2C are explanatory diagrams showing the principle of an electromagnetic induction system.
Figure 2B:
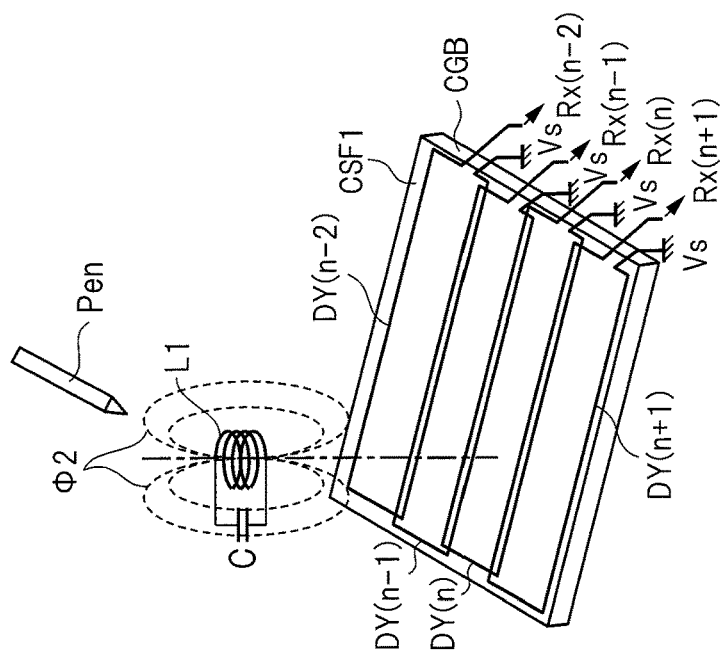
Figure 2C:
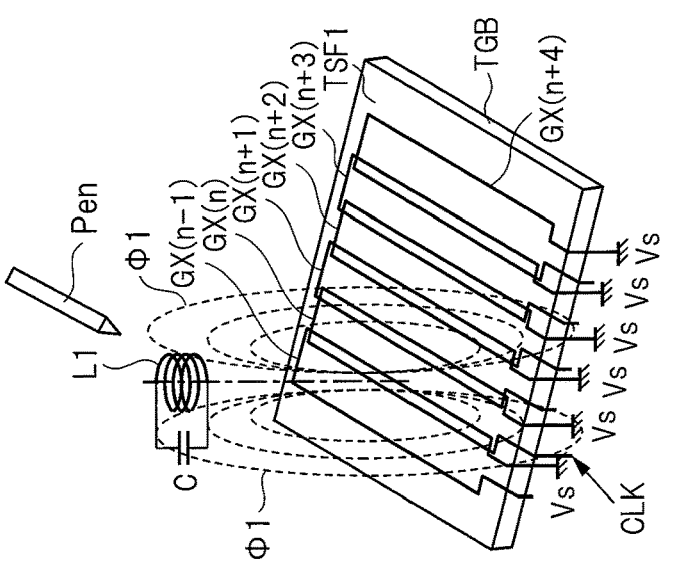

FIG. 2 is an explanatory diagram showing the principle of magnetic field detection. The period of magnetic field detection is composed of a magnetic-field generation period in which a magnetic field is generated and a magnetic-field detection period in which the magnetic field is detected. FIG. 2A and FIG. 2C shown operations during the magnetic-field generation period, and FIG. 2B shows an operation during the magnetic-field detection period. For convenience of explanation, each of FIG. 2A to FIG. 2C shows a state obtained by rotating FIG. 1A by 90 degrees.

In the magnetic-field generation period, ends of predetermined drive electrodes of the drive electrodes TL(0) to TL(p) are electrically connected to each other. Further, a predetermined voltage (for example, ground voltage Vs) and a magnetic-field driving signal are supplied to the connected drive electrodes. For example, right ends of the drive electrodes TL(0) and TL(2) shown in FIG. 1 are electrically connected to each other. Thus, the drive electrodes TL(0) and TL(2) are connected in series with each other. Moreover, the ground voltage Vs is supplied to a left end of the drive electrode TL(0), and the magnetic-field driving signal is also supplied to a left end of the drive electrode TL(2). Here, the magnetic-field driving signal is a signal whose voltage periodically changes. By the drive electrodes TL(0) and TL(2), a coil having an area sandwiched by these drive electrodes inside is configured. The coil generates a magnetic field inside in accordance with the change in the voltage of the magnetic-field driving signal. In the present specification, the coil configured by the drive electrodes so as to generate the magnetic field is referred to also as "magnetic-field generation coil".

In FIG. 2A, a reference character GX(n-1) indicates a magnetic-field generation coil configured by the drive electrodes TL(0) and TL(2). Similarly, reference characters GX(n) to GX(n+4) indicate magnetic-field generation coils configured by the drive electrodes TL(1), TL(3) to TL(p).

In FIG. 2A, reference characters "C" and "L1" indicate a capacitive element and a coil that are embedded in a pen "Pen". The capacitive element C and the coil L1 are connected in parallel with each other so as to configure a resonance circuit. During the magnetic-field generation period, the ground voltage Vs is supplied to one end of each of the magnetic-field generation coils GX(n-1) to GX(n+3), and a magnetic-field driving signal CLK is supplied to the other end thereof. Thus, the magnetic-field generation coil GX(n) generates a magnetic field ϕ1 in accordance with the voltage change of the magnetic-field driving signal CLK. When the pen Pen is close to the magnetic-field generation coil GX(n), an induced voltage is generated in the coil L1 based on mutual induction by the magnetic field ϕ1, so that the capacitive element C is charged.

Next, the sequence proceeds to the magnetic-field detection period shown in FIG. 2B. In the magnetic-field detection period, the magnetic field is detected by using the detection electrodes RL(0) to RL(p). Each of the detection electrodes RL(0) to RL(p) has a pair of ends. The other ends of predetermined detection electrodes of the detection electrodes RL(0) to RL(p) are electrically connected to each other. For example, the upper end of the detection electrode RL(0) and the upper end of the detection electrode RL(3) shown in FIG. 1 are electrically connected to each other on the upper side of FIG. 1. Thus, the detection electrodes RL(0) and RL(3) arranged in parallel with each other are connected in series with each other. In the magnetic-field detection period, the predetermined voltage Vs is supplied to the lower end of the detection electrode RL(3), and the lower end of the detection electrode RL(0) is connected to the detection circuit. Thus, a coil having an area (formed area) sandwiched by the detection electrodes RL(0) and RL(3) inside is formed, and the magnetic field is detected by this coil. In the present specification, the coil configured by the detection electrodes so as to detect the magnetic field is referred to also as "magnetic-field generation coil".

In FIG. 2B, a reference character DY(n-2) indicates a magnetic-field detection coil configured by the detection electrodes RL(0) and RL(3), and reference characters DY(n-1) to DY(n+1) similarly indicate magnetic-field detection coils configured by the detection electrodes RL(2) to RL(p). During the magnetic-field detection period, the predetermined voltage Vs is supplied to one end of each of the magnetic-field detection coils DY(n-1) to DY(n+1), and each of signals Rx(n-2) to Rx(n+1) on the other end thereof is supplied to the unit detection circuit.

If the capacitive element C is charged in the magnetic-field generation period, the coil L1 generates a magnetic field ϕ2, that changes in response to a resonance frequency of the resonance circuit, in accordance with the charge in the capacitive element C. In FIG. 2B, the center (indicated by a one-dot chain line) of the coil L1 is located inside the magnetic-field detection coil DY(n). For this reason, the magnetic-field detection coil DY(n) and the coil L1 are electromagnetically coupled, so that an induced voltage is generated in the magnetic-field detection coil DY(n) by mutual induction between these coils. As a result, the signal Rx(n) output from the magnetic-field detection coil DY(n) is changed in response to a charge amount in the capacitive element C. Each of the unit detection circuits outputs the change in the signal Rx(n) as a detection signal. Thus, it can be detected whether or not the pen Pen is closely located (or touched), or coordinates of the pen Pen can be detected. Moreover, since the detection signal is changed in response to the charge amount, a distance from the pen Pen can be obtained.

FIG. 2C shows a state in which the sequence has proceeded to the magnetic-field generation period again from the state of FIG. 2B. A difference from FIG. 2A is that the magnetic-field driving signal CLK is supplied to the magnetic-field generation coil GX(n+1). Since the position of the pen Pen has not been changed, the induced voltage is not generated in the coil L1 during the magnetic-field generation period shown in FIG. 2C, so that the capacitive element C is not charged. Thus, during the magnetic-field detection period to which the sequence proceeds successively from the state of FIG. 2C, it is detected that the pen Pen is not closely located. Thereafter, similarly, the pen Pen is detected.

<Principle of Electric Field Detection>

Figure 3A:
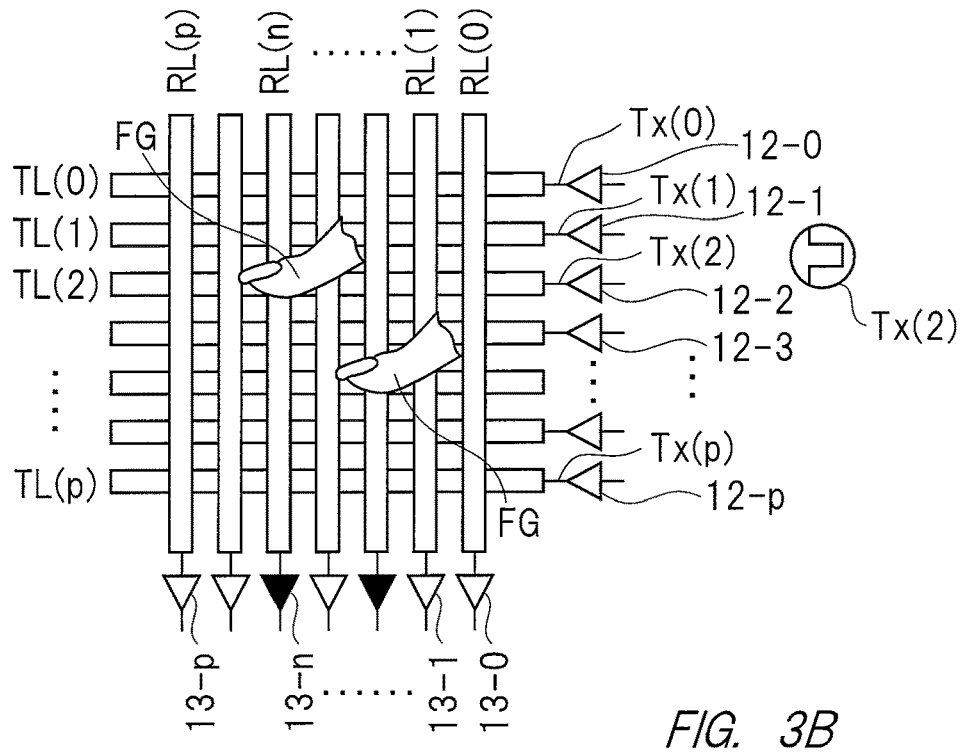
FIG. 3A to FIG. 3C are explanatory diagrams showing the principle of an electrostatic capacitive system.
Figure 3B:
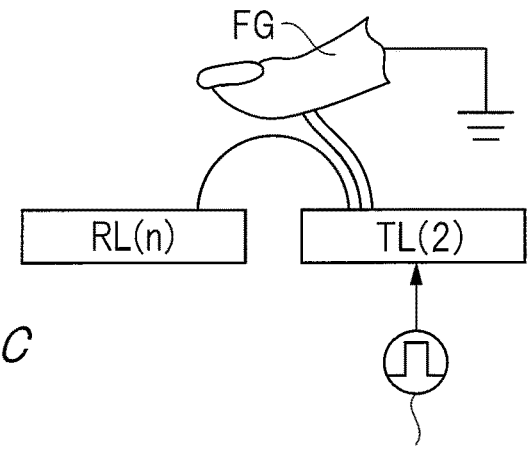
Figure 3C:
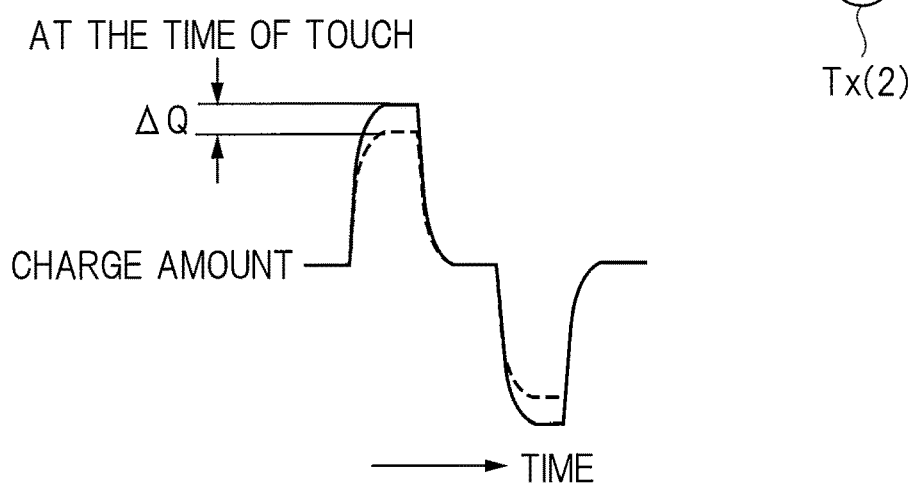

FIG. 3A to FIG. 3C are explanatory diagrams showing the principle of the electric field detection. In FIG. 3A, each of reference characters 12-0 to 12-*p* represents a unit drive electrode driver that outputs an electric field driving signal. Each of reference characters 13-0 to 13*p* represents a unit detection circuit. Moreover, in FIG. 3A, a pulse signal surrounded by a solid-line circle represents a waveform of an electric field driving signal Tx(2) to be supplied to the drive electrode TL(2). As the external object, a finger as a dielectric object is indicated by a reference character "FG".

When the electric field driving signal Tx(2) is supplied to the drive electrode TL(2) as shown in FIG. 3B, an electric field is generated between the drive electrode TL(2) and the detection electrode RL(n) that is orthogonal to the drive electrode TL(2). At this time, when the finger FG is touching the vicinity of the drive electrode TL(2), an electric field is also generated between the finger FG and the drive electrode TL(2). For this reason, the electric field generated between the drive electrode TL(2) and the detection electrode RL(n) is reduced. Thus, the charge amount between the drive electrode TL(2) and the detection electrode RL(n) is reduced. As a result, as shown in FIG. 3C, when the finger FG is touching, the charge amount which is generated in response to the supply of the driving signal Tx(2) is smaller by ΔQ that that when the finger FG is not touching. The difference in the charge amount is supplied to the unit detection circuit 13-n as a difference in voltages, and is output as a detection signal.

The same goes for other drive electrodes and detection electrodes. Therefore, it can be detected whether the finger FG is touching or not, and the coordinates of the touching can be detected.

As described above, in the detection of the magnetic field in the liquid crystal display apparatus of the present embodiment, the magnetic-field driving signal is supplied to the selected drive electrode of the drive electrodes TL(0) to TL(p). Moreover, in the detection of the electric field therein, the electric field driving signal is supplied to the selected drive electrode thereof. On the other hand, in the display, the display driving signal is supplied to the drive electrodes TL(0) to TL(p). Since the drive electrodes TL(0) to TL(p) are set to the same voltage by the display driving signal, the drive electrodes TL(0) to TL(p) can be regarded as a single common electrode.

<Overview of Liquid Crystal Display Apparatus>

Figure 4:
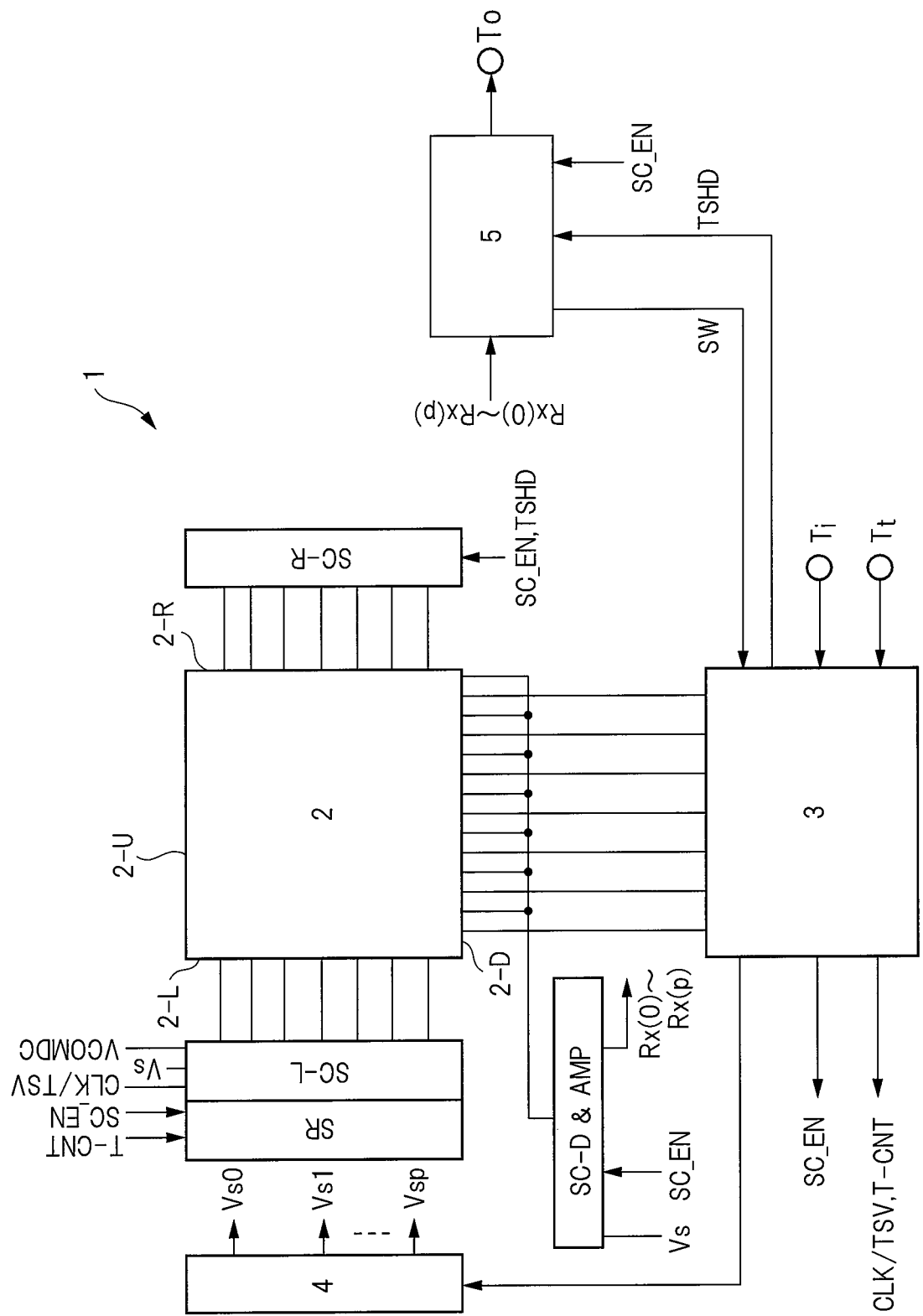
FIG. 4 is a block diagram showing a configuration of the display apparatus according to a first embodiment.

FIG. 4 is a block diagram showing the configuration of the liquid crystal display apparatus 1 according to the first embodiment. In FIG. 4, the liquid crystal display apparatus 1 includes a display panel (liquid crystal panel), a display control device 3, a gate driver 4, and a touch control device 5. The liquid crystal display apparatus 1 also includes a switching drive circuit SC-L, a switching circuit SC-R, a detection control circuit SR, and a switching detection circuit SC-D&. The display panel includes a display area (display portion) where the display is performed and a peripheral area (peripheral portion). From the viewpoint of the display, the display area is an active area, and the peripheral area surrounding the display area is a non-active area. Note that FIG. 4 illustrates the display area 2.

The display area 2 has a pixel array in which a plurality of pixels are arranged in a matrix form. In the pixel array, a plurality of signal lines, a plurality of drive electrodes, a plurality of scanning lines, and a plurality of detection electrodes are arranged. In the description with reference to FIG. 4, the signal lines extend in a vertical direction (column direction) and are arranged in parallel in a horizontal direction (row direction). The drive electrodes extend in the horizontal direction and are arranged in parallel in the vertical direction. Further, the scanning lines extend in the horizontal direction and are arranged in parallel in the vertical direction. And, the detection electrodes extend in the vertical direction and are arranged in parallel in the horizontal direction. In this case, a pixel is arranged in a space formed by intersection between the plurality of signal lines and the plurality of scanning lines. In a period of display (display period), pixels are selected by signal lines and scanning lines for each column. To the selected pixels, the voltage of the signal line and the voltage of the drive electrode at that time are applied. And, each pixel performs a display in accordance with a voltage difference between the signal line and the drive electrode.

The display control device 3 receives a timing signal supplied to an external terminal Tt and image information supplied to an input terminal Ti, forms an image signal in accordance with the image information in the display, and supplies the image signal to the plurality of signal lines. Also, the display control device 3 receives a timing signal supplied to the external terminal Tt and a control signal SW from the touch control device 5, and forms a synchronizing signal TSHD, a magnetic-field enable signal SC_EN, a control signal TSV whose voltage changes periodically, a control signal T-CNT related to touch detection, a coil clock signal CLK, and others.

The magnetic-field enable signal SC_EN is an enable signal enabling the detection of the magnetic field touching (magnetic field touch detection) and the detection of the electric field touching (electric field touch detection). This magnetic-field enable signal SC_EN becomes, for example, at a high level in the magnetic field touch detection and at a low level in the electric field touch detection. The synchronizing signal TSHD is a synchronizing signal that identifies a display period in which the display is performed in the display area 2 and a touch detection period in which the touch detection is performed. In the display period, the synchronizing signal TSHD becomes at the high level, and the magnetic-field enable signal SC_EN becomes at the low level at this time.

The display control device 3 generates the coil clock signal CLK whose voltage changes periodically in the magnetic field touch detection, and generates the control signal TSV whose voltage changes periodically in the electric field touch detection. The coil clock signal CLK and the control signal TSV are exclusively supplied to the same signal wiring although described later. Therefore, FIG. 4 shows the coil clock signal CLK and the control signal TSV as a reference character "CLK/TSV".

In the display period, the gate driver 4 forms scanning line signals Vs0 to Vsp in accordance with a timing signal from the display control device 3, and supplies the scanning line signals Vs0 to Vsp to scanning lines. In the display period, a pixel connected to a scanning line to which a scanning signal with a high level is supplied is selected, and this selected pixel displays an image in accordance with an image signal that is supplied to the signal line at this time.

The touch control device 5 includes a detection circuit DET receives detection signals Rx(0) to Rx(p), extracts coordinates of the touched position, and outputs from the detection circuit DET, and a control circuit T-CNT. The touch control device 5 outputs the control signal SW, and receives the synchronizing signal TSHD and the magnetic-field enable signal SC_EN and operates in synchronization with the display control device 3.

The display area 2 has sides 2-U, 2-D parallel to the row of the pixel array and sides 2-R, 2-L parallel to the column of the pixel array.

The description for the switching circuit SC-R, the switching drive circuit SC-L, the detection control circuit SR, and the switching detection circuit SC-D& is omitted here because of being described later.

<Module Configuration of the Liquid Crystal Display Apparatus 1>

Figure 5:
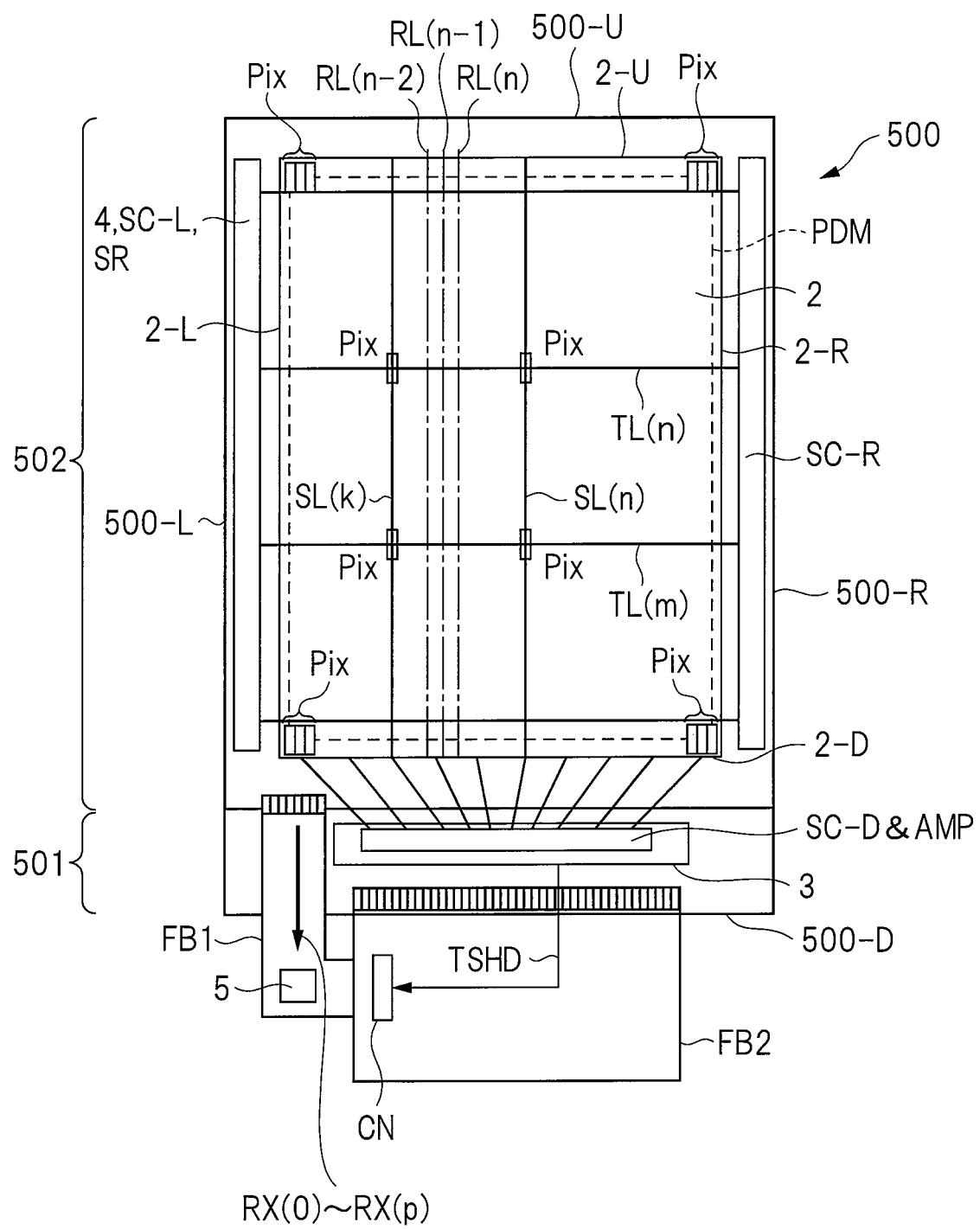
FIG. 5 is a plan view showing a configuration of a module according to the first embodiment.

FIG. 5 is a schematic plan view showing an overall configuration of a module 500 mounted with the liquid crystal display apparatus 1. Although schematically shown, FIG. 5 shows practical arrangement. In this drawing, a reference character 501 indicates an area of the first substrate TGB shown in FIG. 1, and a reference character 502 indicates an area where the first substrate TGB and the second substrate CGB are stacked. In the area 502, the first main surface TSF1 of the first substrate TGB and the second main surface CSF2 of the second substrate CGB are opposite to each other. As shown in FIG. 5, the module 500 has a rectangular shape with a long dimension in up and down directions in a plan view. In FIG. 5, a reference character 500-U and a reference character 500-D indicate short sides of the module 500, and a reference character 500-L and a reference character 500-R indicate long sides of the module 500.

The gate driver 4, the switching drive circuit SC-L, and the detection control circuit SR shown in FIG. 4 are arranged in an area between the side 2-L of the display area 2 and the side 500-L of the module 500 in the area 502. The switching circuit SC-R shown in FIG. 4 is arranged in an area between the side 2-R and the side 500-R. The switching detection circuit SC-D& and the display control device 3 shown in FIG. 4 are arranged in an area between the side 2-D and the side 500-D. The switching detection circuit SC-D& is configured of wirings and components formed in the area 501 on the first main surface TSF1. The display control device 3 is mounted on the first substrate TGB so as to cover the switching detection circuit SC-D& when seen in a plan view. Also, the wirings and components configuring the switching circuit SC-R, the switching drive circuit SC-L, and the detection control circuit SR are also formed in the area 502 on the first main surface TSF1.

The detection signals Rx(0) to Rx(p) described in FIG. 4 are supplied to the touch control device 5 via wirings in a flexible cable FB1. A flexible cable FB2 is connected to the area 501. Through a connector CN mounted on this flexible cable FB2, signals are transmitted/received between the touch control device 5 and the display control device 3.

As described above, the display area 2 includes the pixel array in which a plurality of pixels are arranged in a matrix form. The pixel array has the plurality of drive electrodes TL(0) to TL(p) and the plurality of scanning lines GL(0) to GL(p) arranged along rows in the pixel array, and the plurality of signal lines SL(0) to SL(p) and the plurality of detection electrodes RL(0) to RL(p) arranged along columns in the array. In FIG. 5, two drive electrodes TL(n) and TL(m), two signal wires SL(k) and SL(n), and three detection electrodes RL(n−2) to RL(n) are shown as an example. Note that the scanning lines are omitted in FIG. 5. However, the scanning lines extend in parallel with the exemplified drive electrodes TL(n) and TL(m).

In FIG. 5, the pixel array is shown by a broken line PDM. Pixels arranged at four corners of the display area 2 and pixels arranged at the intersection between the exemplified drive electrodes and the signal lines among the plurality of pixels arranged in the pixel array PDM are shown as a reference character Pix.

<Configurations of Switching Circuit SC-R, switching drive circuit SC-L and Detection Control Circuit SR>
<Configurations of Switching Circuit SC-R, Switching Drive Circuit SC-L, and Detection Control Circuit SR>

Figure 6:
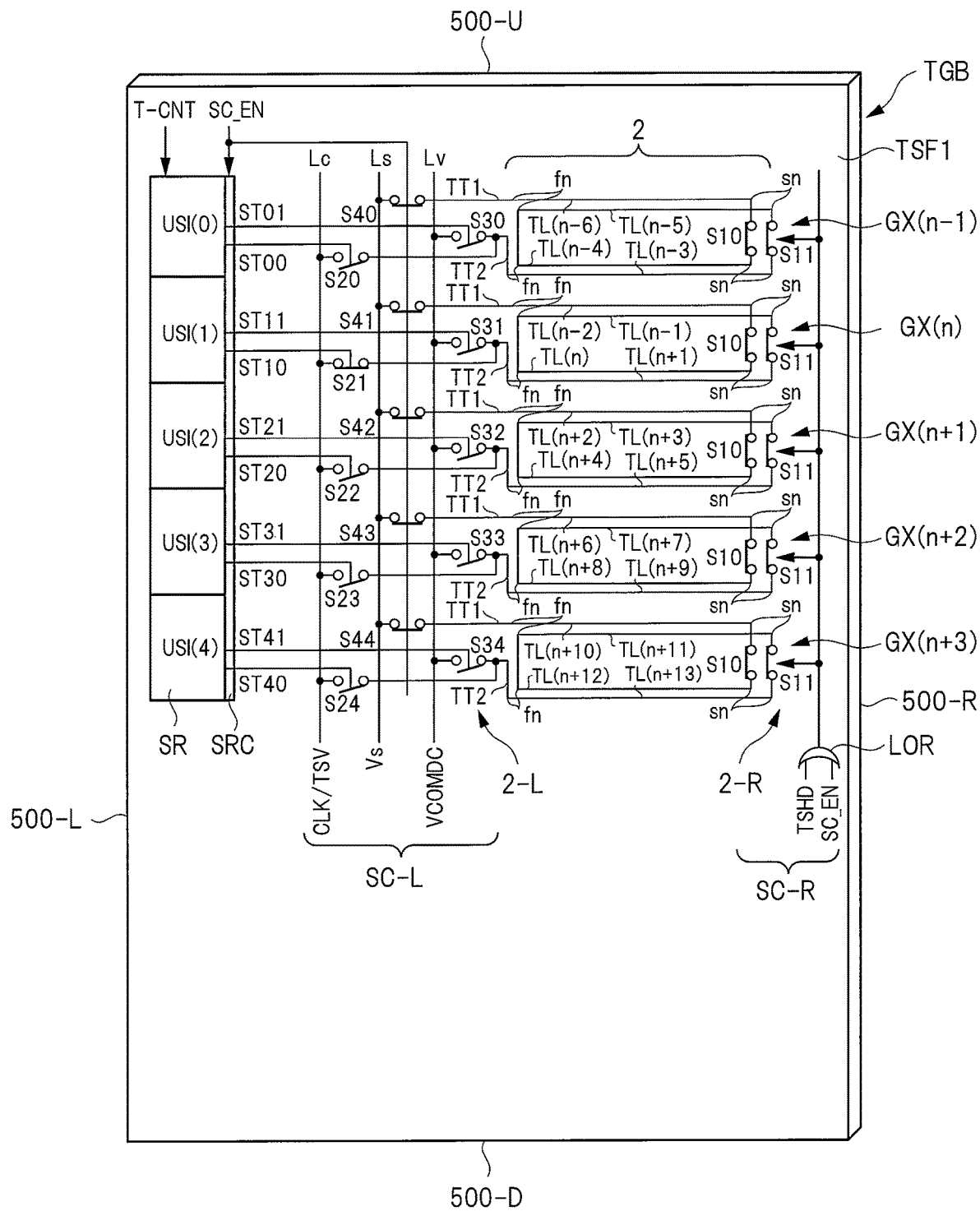
FIG. 6 is a block diagram showing a configuration of a magnetic field touch detection according to the first embodiment.
Figure 7:
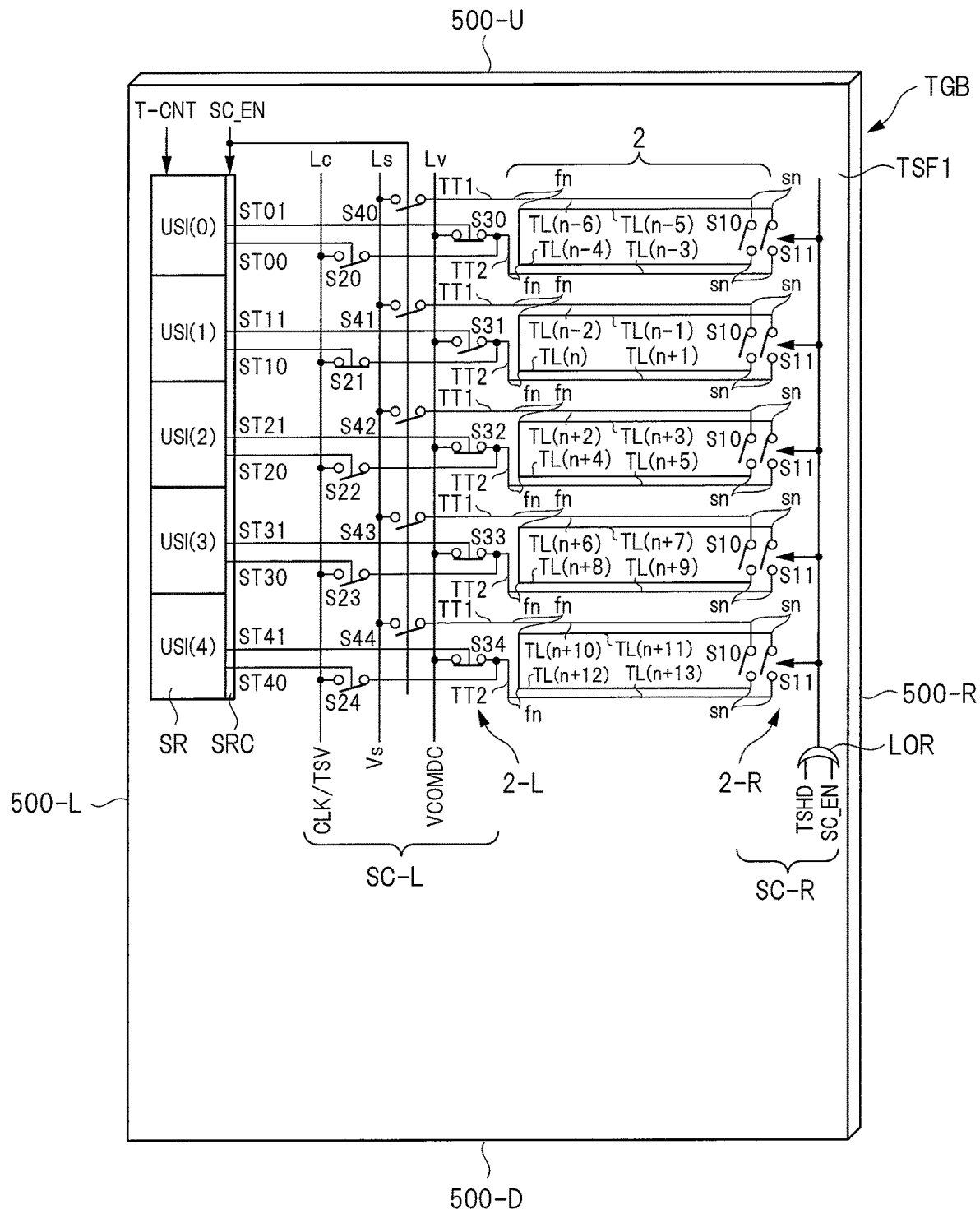
FIG. 7 is a block diagram showing a configuration of an electric field touch detection according to the first embodiment.
Figure 8:
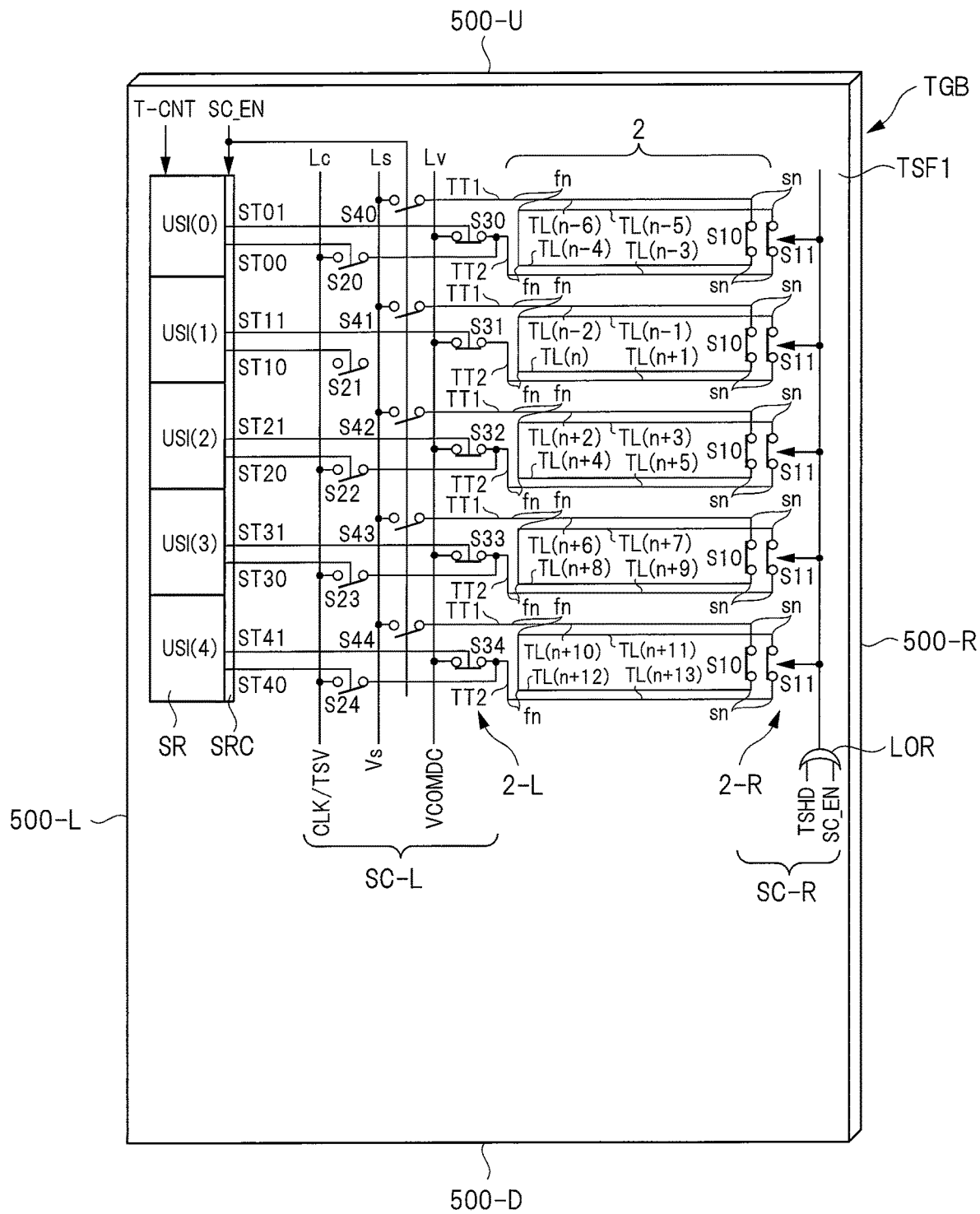
FIG. 8 is a block diagram showing a configuration of a display period according to the first embodiment.

Each of FIGS. 6 to 8 is a block diagram showing a configuration of the liquid crystal display apparatus 1 according to the first embodiment. Each of FIGS. 6 to 8 shows drive electrodes TL(n−6) to TL(n+13) among the drive electrodes TL(0) to TL(p) arranged in the display area 2. Also in the switching circuit (second switching circuit) SC-R, the switching drive circuit SC-L, and the detection control circuit SR, only their parts corresponding to the drive electrodes TL(n−6) to TL(n+13) are shown. In these drawings, reference characters Ls, Lv, and Lc represent signal wirings. The ground voltage Vs is supplied to the signal wiring Ls, while a predetermined voltage VCOMDC is supplied to the signal wiring Lv. To the signal wiring Lc, the coil clock signal CLK is supplied in the magnetic field touch detection, and the control signal TSV whose voltage periodically changes is supplied in the electric field touch detection.

The detection control circuit SR is provided with a control circuit SRC and a shift register in which shift stages USI(0) to USI(4) are connected in series with one another, and forms and outputs a selection signal for selecting an area from which the touch is to be detected in the display area 2. By a control signal T-CNT, a selection value is set at a predetermined register stage, and the selection value is shifted in accordance with a shift clock signal not shown. The control circuit SRC forms and outputs selection signals ST00 to ST40 and ST01 to ST41 in accordance with the magnetic-field enable signal SC_EN and the selection value from the shift register.

FIG. 6 shows operations at the time of the magnetic field touch detection, FIG. 7 shows operations at the time of the electric field touch detection, and FIG. 8 shows operations at the time of the display. With reference to FIG. 6 to FIG. 8, the operations of the switching circuit SC-R, the switching drive circuit SC-L and the detection control circuit SR will be described.

First, with reference to FIG. 6, the control of the drive electrodes at the time of the magnetic field touch detection will be described. In the magnetic field detection, double-winding magnetic-field generation coils GX(n−1) to GX(n+3) are configured by drive electrodes TL(n−6) to TL(n+13). Here, explanation will be made while exemplifying drive electrodes TL(n−2) to TL(n+1). The drive electrodes TL(n−2) to TL(n+1) respectively are in parallel with one another and extend in the row direction (horizontal direction in FIG. 6) in the display area 2. The switching circuit SC-R has a plurality of first switches S10 and a plurality of second switches S11. At the time of the magnetic field touch detection, the magnetic-field enable signal SC_EN is set to a high level, and a synchronizing signal TSHD is set to a low level. Thus, an output of a logical addition circuit LOR is set to the high level, so that the first switches S10 and the second switches S11 are switched on, and the drive electrodes TL(n−2) to TL(n+1) are connected in series with one another between the terminals TT1 and TT2 of the magnetic-field generation coil GX(n). As a result, the magnetic-field generation coil GX(n) is formed.

When the control circuit SRC receives the high level magnetic-field enable signal SC_EN and the selection value from the shift stage USI(1), the control circuit SRC sets the selection signal ST10 to the high level, sets the selection signals ST00 and ST20 to ST40 to the low level, and also sets the selection signals ST01 to ST41 to the low level. As a result, among the third switches S20 to S24 and the fourth switches S30 to S34, only the third switch S21 is switched on as shown in FIG. 6, and other switches are switched off. At this time, fifth switches S40 to S44 are switched on by the high level magnetic-field enable signal SC_EN. Thus, the ground voltage Vs is supplied from the signal wiring Ls to the end TT1 of the magnetic-field generation coil GX(n), and the coil clock signal CLK is supplied as a magnetic-field driving signal from the signal wiring Lc to the end TT2. As a result, the magnetic-field generation coil GX(n) generates a magnetic field in accordance with the change in the coil clock signal CLK.

Next, with reference to FIG. 7, the control of the drive electrodes at the time of the electric field touch detection will be described. In this case, since the magnetic-field enable signal SC_EN becomes the low level, the first and second switches S10 and S11 are switched off. When the control circuit SRC receives the low level magnetic-field enable signal SC_EN and the selection value from the shift stage USI(1), the control circuit SRC sets the selection signal ST10 to the high level, sets the selection signal ST11 to the low level, sets other selection signals ST00 and ST20 to ST40 to the low level, and also sets the selection signals ST01 to ST41 to the low level. Thus, as shown in FIG. 7, the third switch S21 and the fourth switches S30 and S32 to S34 are switched on, and the fourth switch S31 and the fifth switches S40 to S44 are switched off.

As a result, only to the one end fn of the drive electrode TL(n+1), the control signal TSV is supplied from the signal wiring Lc as the electric field driving signal. To the rest of drive electrodes, no control signal TSV is supplied. Thus, the drive electrode TL(n+1) generates an electric field in accordance with the change in the control signal TSV.

Since the synchronizing signal TSHD becomes the high level in the display, the first switch S10 and the second switch S11 are switched on. Moreover, regardless of the value from the shift stage, the control circuit SRC sets the selection signals ST00 to ST40 to the low level and also sets the selection signals ST01 to ST41 to the high level. Furthermore, the magnetic-field enable signal SC_EN becomes the low level. As a result, as shown in FIG. 8, the third switches S20 to S24 and the fifth switches S40 to S44 are switched off, and the fourth switches S20 to S34 are switched on. Thus, to the drive electrodes TL(n−2) to TL(T+1), a predetermined voltage VCOMDC is supplied from the signal wiring Lv as the display driving signal. In the display, note that the first switch S10 and the second switch S11 may be switched off. In this case, in the display, the number of the drive electrodes to which the display driving signal is supplied is reduced. However, the logical addition circuit LOR becomes unnecessary.

In the foregoing, the explanation has been made while exemplifying the drive electrodes TL(n−2) to TL(n+1). However, the same goes for other drive electrodes.

<Arrangement of Detection Electrodes and Configuration of Switching Detection Circuit SC-D&>

Figure 9:
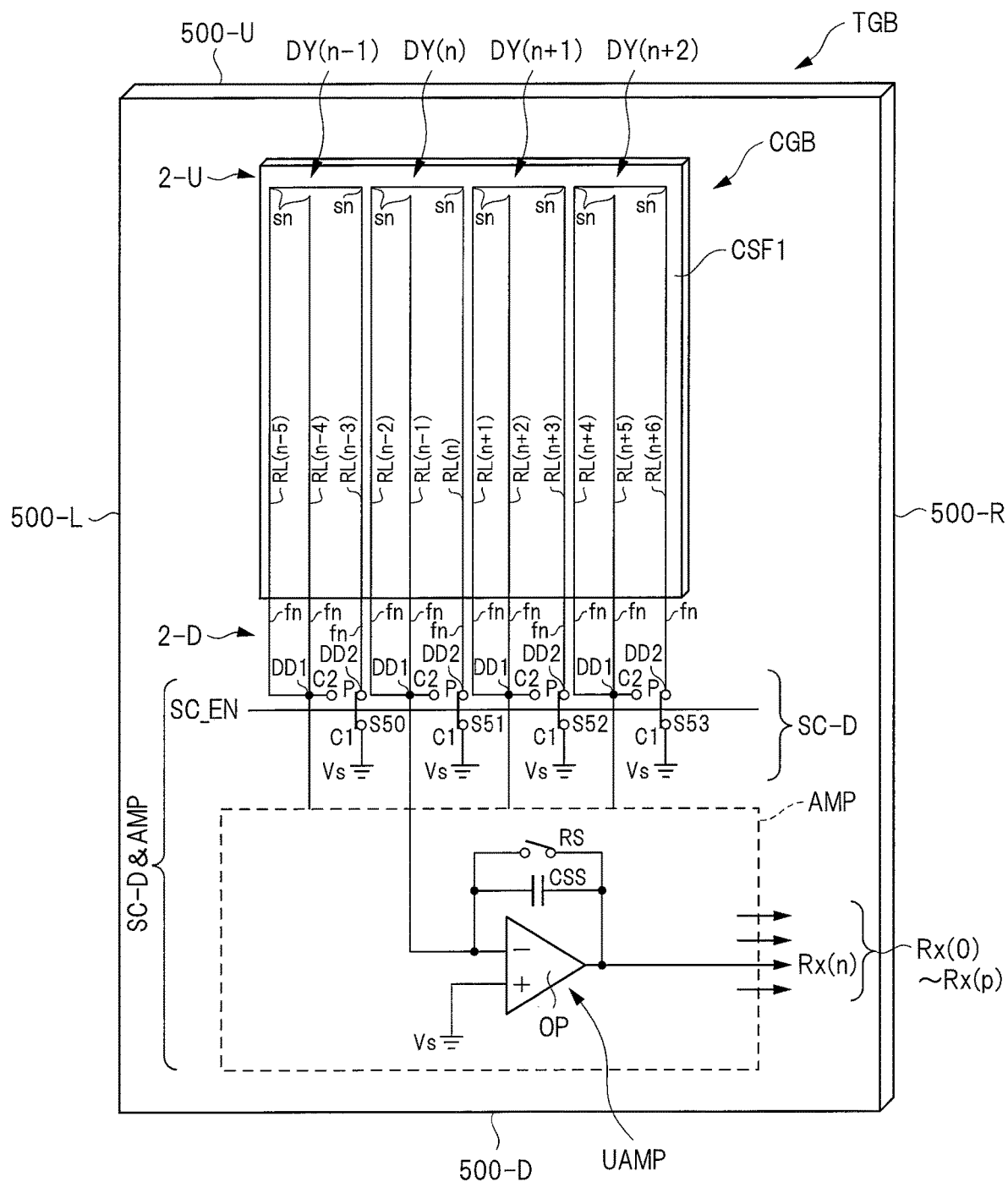
FIG. 9 is a block diagram showing the configuration of the magnetic field touch detection according to the first embodiment.
Figure 10:
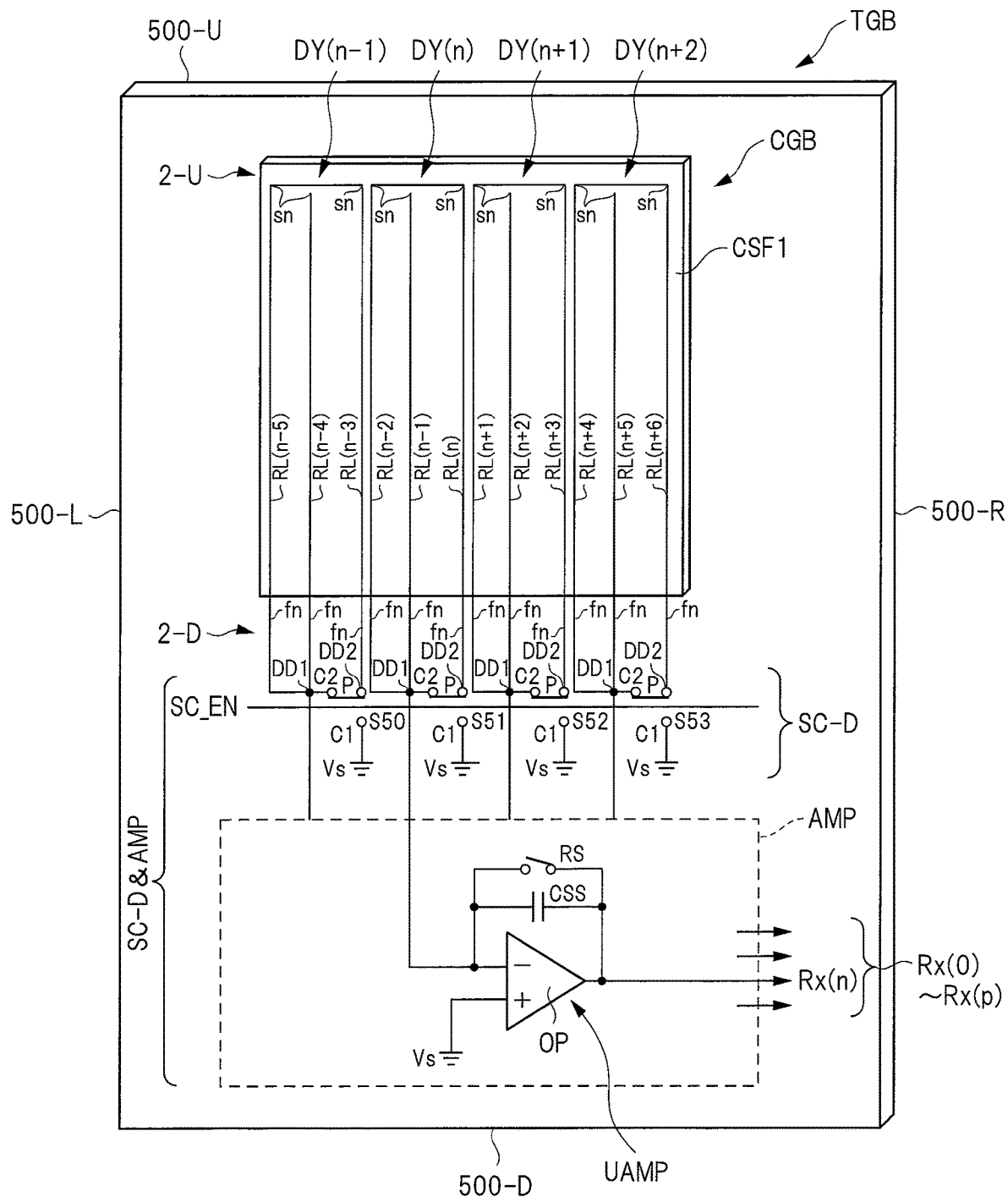
FIG. 10 is a block diagram showing the configuration of the electric field touch detection according to the first embodiment.

FIG. 9 and FIG. 10 are block diagrams showing the configuration of the liquid crystal display apparatus 1 according to the first embodiment. FIG. 9 and FIG. 10 show a configuration of the switching detection circuit SC-D& and arrangement of the detection electrodes RL(0) to RL(p). FIG. 9 shows a state at the time of the magnetic field touch detection, and FIG. 10 shows a state at the time of the electric field touch detection. The configuration of the switching detection circuit SC-D& and the arrangement of the detection electrodes RL(0) to RL(p) are the same between FIG. 9 and FIG. 10. For this reason, with reference to FIG. 9, the configuration of the switching detection circuit SC-D& and the arrangement of the detection electrodes RL(0) to RL(p) will be described, and this explanation is omitted in FIG. 10.

As described above, the detection electrodes RL(0) to RL(p) are formed on the first main surface CSF1 of the second substrate CGB, and extend in the column direction (vertical direction) and are arranged in parallel with one another in the row direction (horizontal direction) in a plan view. Therefore, in a plan view, the detection electrodes RL(0) to RL(p) intersect with the drive electrodes TL(0) to TL(p). In the present embodiment, those electrodes orthogonally intersect with one another. However, another configuration in which those electrodes intersect so as not to be in orthogonal with one another may be adopted.

In FIG. 9, among these detection electrodes RL(0) to RL(p), detection electrodes RL(n−5) to RL(n+6) are exemplified. Hereinafter, the explanation will be made by using the exemplified detection electrodes RL(n−2) to RL(n). In FIG. 9, note that a scale or others is reduced in order to easily see the drawing. However, the illustration is made in accordance with the practical arrangement.

In the first embodiment, in a plan view, a pair of detection electrodes (first electrodes) are arranged so as to sandwich one detection electrode (second electrode). Moreover, one magnetic-field detection coil is configured by connecting the other ends sn of the pair of detection electrodes to each other. Furthermore, the other end sn of one detection electrode sandwiched by the pair of detection electrodes is electrically insulated from the pair of detection electrodes. The electrical insulation described here means that the other ends sn of the pair of detection electrodes and the other end sn of the sandwiched detection electrode are physically separated from each other so that no means for directly connecting these other ends sn are provided between the pair of detection electrodes and the sandwiched detection electrode. In other words, a gap is provided between the pair of detection electrodes and the end sn of the detection electrode sandwiched by the pair of detection electrodes. On the other hand, one end fn of the sandwiched detection electrode is connected to the pair of detection electrodes. That is, in a plan view, one detection electrode is formed in the magnetic-field detection coil, and only one end of this detection electrode is connected to the magnetic-field detection coil.

First, with reference to FIG. 9, operations at the time of the magnetic field touch detection will be described. In a plan view, an upper end sn of a detection electrode RL(n−2) and an upper end sn of a detection electrode RL(n) arranged so as to sandwich a detection electrode RL(n−1) are electrically connected to each other in the vicinity of the side 2-U. Thus, a single-winding magnetic-field detection coil DY(n) is formed inside the display area 2. A lower end fn of the sandwiched detection electrode RL(n−1) is connected to a lower end fn of the detection electrode RL(n−2). However, the upper end sn is electrically insulated from the pair of detection electrodes RL(n−1) and RL(n+1) as described above. Similarly, magnetic-field detection coils DY(n−1) and DY(n+1) to DY(n+2) are configured by pair of detection electrodes arranged so as to sandwich one detection electrode therebetween.

The switching detection circuit SC-D& is provided with a switching circuit (first switching circuit) SC-D and a detection circuit AMP. The switching circuit SC-D is provided with sixth switches S50 to S53 corresponding to the magnetic-field detection coils DY(n−1) to DY(n+1), respectively. Moreover, the detection circuit AMP is also provided with a plurality of unit detection circuits UAMP corresponding to the magnetic-field detection coils DY(n−1) to DY(n+1), respectively.

Each of the sixth switches S50 to S53 is provided with a common terminal P, a first terminal C1 and a second terminal C2. In the following description, the configuration of the sixth switch S1 at the lower end of the detection electrode RL(n) will be described. Note that other sixth switches also have the same configuration.

The lower end fn of the detection electrode RL(n) is connected to the common terminal P. Moreover, the first terminal C1 is connected to the ground voltage Vs, and the second terminal C2 is connected to the lower ends fn of the detection electrode RL(n−2) and RL(n−1). As shown in FIG. 9, when the magnetic-field enable signal SC_EN is set to the high level for specifying the magnetic field touch detection, the sixth switch S51 connects the common terminal P to the first terminal C1. The second terminal C2 is also connected to the corresponding unit detection circuit UAMP. In the second terminal C2, note that one terminal DD1 of the magnetic-field detection coil DY(n) can be regarded as the other terminal DD2 of the magnetic-field detection coil DY(n). Note that the other terminal DD2 of the magnetic-field detection coil DY(n) may include the common terminal P. Moreover, when the detection electrodes RL(n−2) and RL(n) are regarded as the first electrodes, the detection electrode RL(n−2) is regarded as the first first electrode, and the detection electrode RL(n) is regarded as the second first electrode.

At the time of the magnetic field touch detection, as shown in FIG. 9, the common terminal P of the sixth switch S51 is connected to the first terminal C1, and the second terminal C2 is connected to the unit detection circuit UAMP. For this reason, as explained in FIG. 2B, when the coil L1 of the pen Pen generates a magnetic field during the magnetic-field detection period, the induced voltage is generated by the magnetic-field detection coil DY(n), so that the signal on one end DD1 of the magnetic-field detection coil DY(n) is changed. The changed signal is supplied to the unit detection circuit UAMP.

The unit detection circuit UAMP is configured by an integration circuit in the first embodiment. The unit detection circuit UAMP is provided with an operation amplifier OP, a capacitive element CSS and a reset switch RS. The ground voltage Vs is supplied to a positive-phase input (+) of the operation amplifier OP, and a reverse-phase input (−) thereof is connected to the second terminal C2 of the sixth switch S51. The capacitive element CSS and the reset switch RS are connected in parallel with each other between the output of the operation amplifier OP and the reverse-phase input (−). By integrating the change in the signal in the magnetic-field detection coil DY(n), the unit detection circuit UAMP forms and outputs a detection signal RX(n).

The same goes for other magnetic-field detection coil DY(n−1) and DY(n+1) to DY(n+2).

Next, with reference to FIG. 10, operations at the time of the electric field touch detection will be described. Since the magnetic-field enable signal SC_EN becomes the low level at the time of the electric field touch detection, the common terminal P is connected to the second terminal C2 at each of the sixth switches S50 to S53 as shown in FIG. 10. While the sixth switch S51 will be described below, other sixth switches are similarly controlled.

In the sixth switch S51, the respective lower ends fn of the detection electrodes RL(n−2), RL(n−1) and RL(n) are connected to the unit detection circuit UAMP by connecting the common terminal P to the second terminal C2. That is, the respective lower ends fn are connected to the reversed phase inputs (−) of the operation amplifiers OP. In other words, one end DD1 of the magnetic-field detection coil DY(n) and the other end DD2 thereof are electrically connected to each other through the sixth switch S51. That is, the other end DD2 is separated from the ground voltage Vs and is connected to one end DD1, and is also connected to the unit detection circuit UAMP. At this time, the lower end fn of the detection electrode RL(n−1) arranged between the detection electrodes RL(n−2) and RL(n) is also connected to the same unit detection circuit UAMP.

As explained in FIG. 7, at the time of the electric field touch detection, an electric field driving signal (TSV) whose voltage changes periodically is supplied to the selected drive electrode (for example, TL(n+1)). Thus, an electric field is generated between the selected drive electrode (TL(n+1)) and the detection electrodes RL(n−2), RL(n−1) and RL(n). As explained in FIG. 3, when the finger is touching, the charge amount is changed, so that a signal change is generated in each of the lower ends fn of the detection electrode RL(n−2), RL(n−1) and RL(n). This signal change is integrated for a predetermined period of time by the unit detection circuit UAMP, and the resulting signal is supplied to the touch control device 5 as a detection signal (for example, Rx(n)).

In the first embodiment, the detection electrode (RL(n−1)) arranged between the pair of detection electrodes (for example, RL(n−2) and RL(n)) that form a magnetic-field detection coil is also used for detecting an electric field. When no detection electrode is arranged between the pair of detection electrodes forming the magnetic-field detection coil, detection sensitivity for detecting change in an electric field caused by the touch of the finger is lowered in the area between the pair of detection electrodes. On the other hand, in the first embodiment, since the detection electrode arranged between the pair of detection electrodes is also used for detecting the change in the electric field, the lowering of the detection sensitivity can be reduced.

In the first embodiment, one end fn of the detection electrode RL(n−1)) sandwiched by the pair of detection electrodes RL(n−2) and RL(n) forming the magnetic-field detection coil DY(n) is connected to the detection electrode RL(n−2) forming the magnetic-field detection coil DY(n), and the other end sn thereof is electrically insulated from the detection electrodes RL(n−2) and RL(n). As a result, a closed coil (coil smaller than the coil configured by the detection electrodes RL(n−2) to RL(n)) is not configured by the detection electrode RL(n−1) and the detection electrode RL(n−2), and therefore, the magnetic field is not disturbed by this coil.

<Configuration of Detection Electrode>

Figure 11:
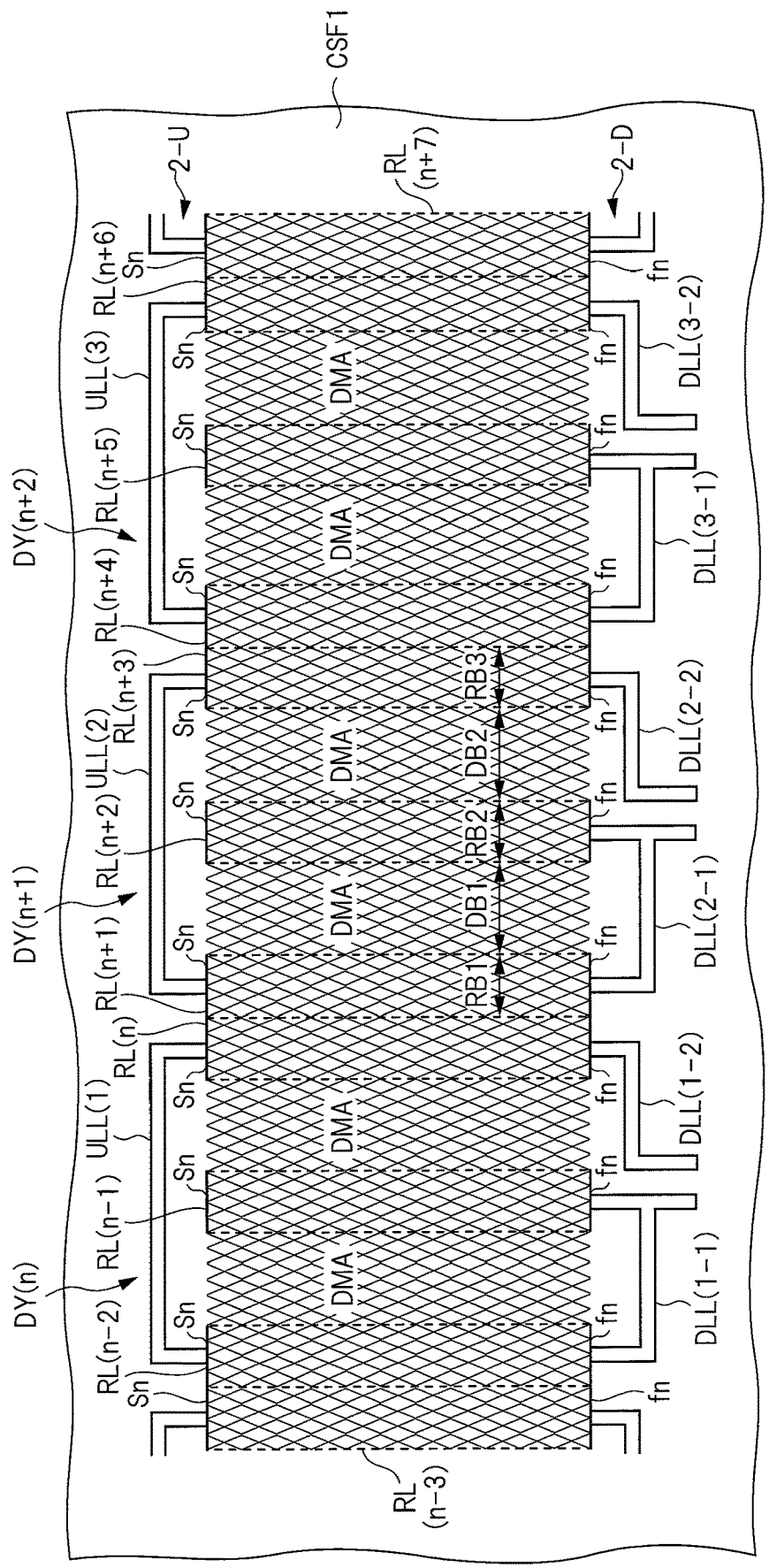
FIG. 11 is a plan view showing a configuration of a detection electrode according to the first embodiment.

FIG. 11 is a plan view schematically showing the configuration of the detection electrode according to the first embodiment. FIG. 11 is a plan view schematically showing a plurality of detection electrodes arranged on a first main surface CSF1 of a second substrate CGB. In FIG. 11, detection electrodes RL(n−3) to RL(n+7) among the plurality of detection electrodes are illustrated as typified. The detection electrodes RL(n−3) to RL(n+7) are respectively arranged so as to be in parallel with one another in an area to be the display area 2 on the first main surface CSF1. That is, the respective detection electrodes are arranged so as to extend in a column direction (vertical direction) and also to be arranged in parallel with a row direction (horizontal direction) in the display area 2. In reference to FIG. 5, in a plan view, the detection electrodes RL(n−3) to RL(n+7) are arranged between aside 2-R and a side 2-L of the display area 2 so as to orthogonally intersect with the respective drive electrodes TL(0) to TL(p).

On the first main surface CSF1, signal wirings ULL(1), ULL(2) and ULL(3) are formed to be closer to the side 2-U of the display area 2. Moreover, signal wirings DLL(1-1), DLL(1-2), DLL(2-1), DLL(2-2), DLL(3-1) and DLL(3-2) are formed to be closer to the side 2-D of the display area 2. By these signal wirings, the detection electrodes are connected with one another as shown in FIG. 9 and FIG. 10.

When the detection electrodes RL(n−2) and RL(n) are exemplified, the upper end sn of the detection electrode RL(n−2) and the upper end sn of the detection electrode RL(n) are connected to each other by the signal wiring ULL(1). Moreover, the lower end fn of the detection electrode RL(n−2) and the lower end fn of the detection electrode RL(n−1) are connected to each other by the signal wiring DLL(1-1). The signal wiring DLL(1-1) is connected to the second terminal C2 of the sixth switch S51 shown in FIG. 9 and FIG. 10, and also to the reverse phase input (−) of the corresponding unit detection circuit UAMP. Moreover, the lower end fn of the detection electrode RL(n) is connected to the signal wiring DLL(1-2), and the signal wiring DL(1-2) is connected to the common terminal P of the sixth switch S51 shown in FIG. 9 and FIG. 10. The other detection electrodes also have the same configuration.

In FIG. 11, reference characters RB1 and RB3 indicate widths (electrode widths) of a pair of detection electrodes RL(n+1) and RL(n+3) forming the magnetic-field detection coil DY(n+1), and a reference character RB2 indicates the width (electrode width) of the detection electrode RL(n+2). Moreover, in the same drawing, a reference character DB1 indicates a width between the detection electrode RL(n+1) and the detection electrode RL(n+2), and a reference character DB2 indicates a width between the detection electrode RL(n+2) and the detection electrode RL(n+3). In the first embodiment, in a plan view, dummy electrode areas DMA are arranged between the detection electrodes RL(n+1), RL(n+3) and the detection electrode RL(n+2). Therefore, the DB1 and the DB2 can be regarded as the width of the dummy electrode area DMA.

In the first embodiment, each of the detection electrodes RL(n+1) to RL(n+3) is configured by a plurality of polygonal electrodes that are arranged in a mesh form. In other words, the respective detection electrodes RL(n+1) to RL(n+3) are arranged in matrix, and each of them is configured by a plurality of polygonal electrodes electrically connected to each other. When it is assumed that the plurality of polygonal electrodes are arranged in matrix, the widths in the horizontal direction (row direction) of the matrix correspond to RB1, RB2 and RB3, and a plurality of groups of the plurality of polygonal electrodes arranged in each of the widths are arranged along the vertical direction (column direction).

In the detection electrodes RL(n+1) to RL(n+3), a plurality of polygonal electrodes forming each of the electrodes are electrically connected to each other. Therefore, one end fn and the other end sn of each of the detection electrodes are electrically connected to each other.

The dummy electrode area DMA is also configured by a plurality of polygonal dummy electrodes arranged in a mesh form. When it is assumed that the dummy electrode area DMA is configured by the plurality of polygonal electrodes arranged in matrix, the widths in the horizontal direction (row direction) of the matrix correspond to DB1 and DB2, and a plurality of groups of the plurality of polygonal electrodes arranged in each of the widths are arranged along the vertical direction (column direction).

As explained later, the polygonal dummy electrodes arranged in the dummy electrode area DMA are electrically insulated from each other. Note that it is also possible not to arrange the dummy electrodes. On the other hand, when the dummy electrodes are not arranged, in the display area 2, differences are undesirably made in display characteristics such as contrast, light reflection and others between an area where the detection electrodes are arranged and an area where the detection electrodes are not arranged. As a result, there is a risk of visual recognition of the detection electrodes. On the other hand, in the first embodiment, the display characteristics can be uniformed in the entire display area by arranging the dummy electrode between the detection electrodes, so that the visual recognition of the detection electrodes becomes difficult.

The explanation has been made while exemplifying the detection electrodes RL(n+1) to RL(n+3) and the dummy electrode area DMA sandwiched by these electrodes. However, other detection electrodes and dummy electrode area sandwiched by the detection electrode are similarly configured.

At the time of the electric field touch detection, the change in the electric field can be detected by not only the detection electrode forming the magnetic-field detection coil but also the detection electrode arranged inside the magnetic-field detection coil, and therefore, an area where the detection sensitivity is lowered can be reduced, so that the lowering of the detection sensitivity at the time of the electric field touch detection can be reduced.

<Structures of Electrode and Dummy Electrode>

Figure 12A:
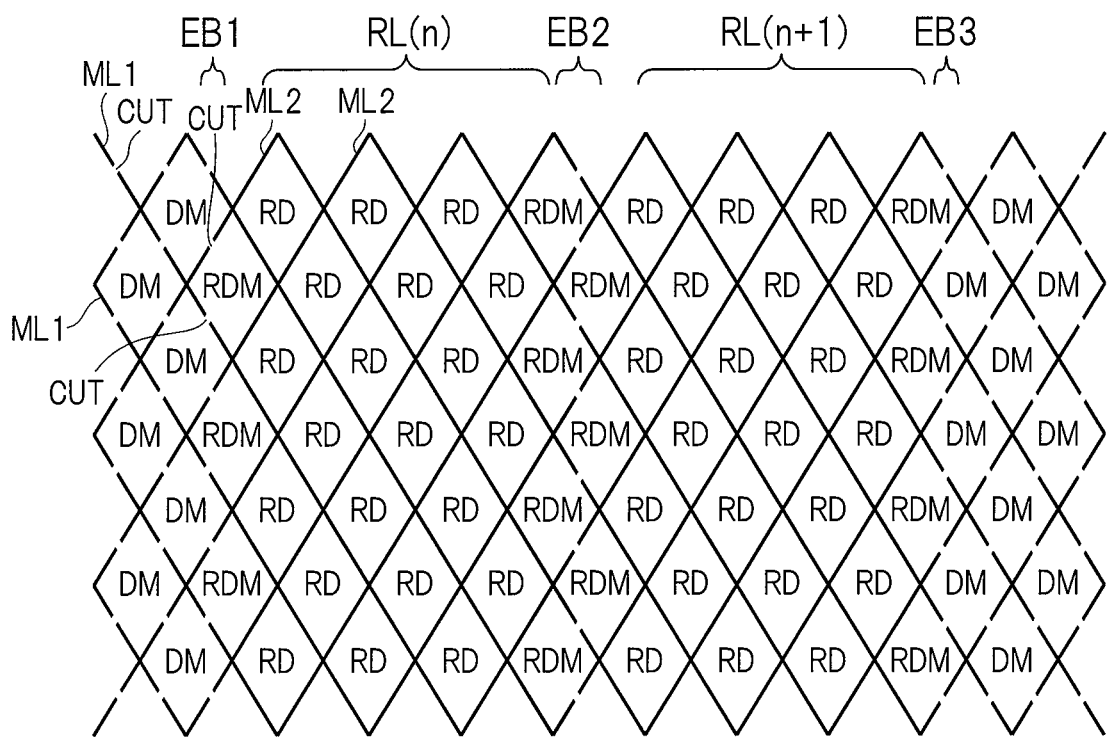
FIG. 12A to FIG. 12C are plan views showing the detection electrode and a dummy electrode area according to the first embodiment.
Figure 12B:
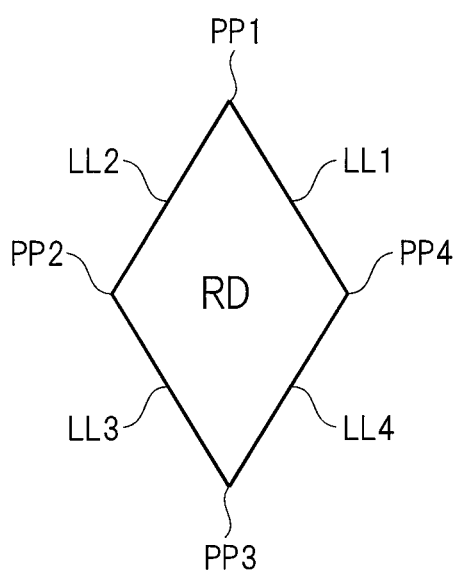
Figure 12C:
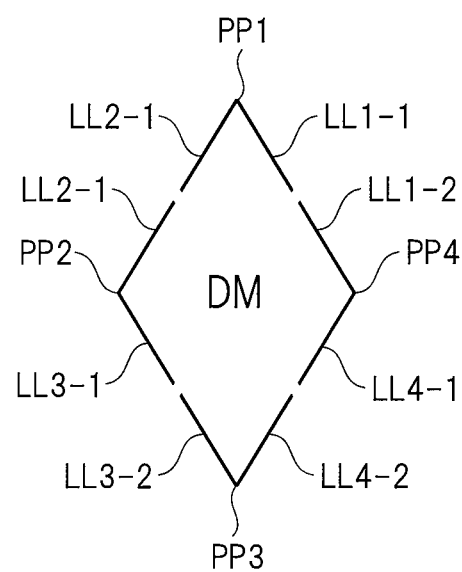

FIG. 12 is a plan view showing the structures of the detection electrode and the dummy electrode area according to the first embodiment. FIG. 12A is a plan view showing apart of the detection electrodes RL(n) and RL(n+1) shown in FIG. 11 to be enlarged. Moreover, FIG. 12B is a plan view showing the structure of the polygonal electrode forming the detection electrode, and FIG. 12C is a plan view showing the structure of dummy electrodes arranged in a dummy electrode area.

In FIG. 12A, a reference character RD indicates a polygonal electrode forming the detection electrode. In the first embodiment, the polygonal electrode RD has a rhombic shape. In FIG. 12A, a reference character DM indicates a dummy electrode whose outer shape is rhombic as the same as the electrode RD and in the first embodiment. Moreover, in FIG. 12A, a reference character EB1 indicates a border area between a detection electrode RL(n) and a dummy electrode area DMA adjacent to this detection electrode. A reference character EB2 indicates a border area between the detection electrode RL(n) and a detection electrode RL(n+1) adjacent to this detection electrode. A reference character EB3 indicates a border area between the detection electrode RL(n+1) and the dummy electrode area DMA adjacent to this detection electrode.

First, with reference to FIG. 12B, the rhombic electrode RD forming the detection electrode will be described. The electrode RD is provided with electrode wirings LL1 to LL4, and these electrode wirings LL1 to LL4 are arranged along the respective sides of the rhombus. These electrode wirings LL1 to LL4, each having a width of several μm to several tens of μm, are electrically connected to one another. For example, the electrode wirings LL1 and LL2 are connected to each other at the vertex PP1 of the rhombus. Similarly, the electrode wirings LL2 and LL4 are connected to each other at vertices PP2 to PP4 thereof. In the electrode RD, there is no wiring inside and outside the rhombus (polygon) surrounded by the electrode wirings LL1 to LL4. For this reason, in a plan view, the rhombic (polygonal) area (space) closed by the electrode wirings LL1 to LL4 is formed, and is used as the electrode RD.

The dummy electrode DM has a structure shown in FIG. 12C. Although the dummy electrode DM also has electrode wirings LL1 to LL4 arranged along the respective sides of the rhombus, each of the electrode wirings is divided into two electrode wirings. For example, the electrode wiring LL1 is divided into electrode wirings LL1-1 and LL1-2, which are arranged between the vertex PP1 and the vertex PP4 of the rhombus. Each of the remaining electrode wirings LL2 to LL4 is also similarly divided into two electrode wirings, and is arranged between the vertices of the rhombus.

In the dummy electrode DM, each of the electrode wirings LL1 to LL4 is divided into two electrode wirings, and the divided electrode wirings are arranged along the sides of the rhombus, so that the rhombic shape (polygonal shape) is formed. There is no wiring inside and outside the rhombus. In a plan view, the dummy electrode DM can be regarded as being configured by the rhombic (polygonal) area (space) configured by the electrode wirings LL1-1, LL1-2 to LL4-1 and LL4-2.

As shown in FIG. 12A, a plurality of the rhombic electrodes RD shown in FIG. 12B are arranged in horizontal and vertical directions. In this arrangement, the vertices of the electrode RD, that is, the vertices PP1 to PP4 of the rhombus are electrically connected to the vertices of the electrodes RD (vertices of rhombi) adjacent in up, down, right, and left directions. Note that the electrode wiring arranged on the side is shared between the adjacent electrodes RD.

Moreover, in the dummy electrode area DMA, as shown in FIG. 12A, a plurality of the rhombic dummy electrodes DM shown in FIG. 12C are arranged in horizontal and vertical directions. Also in the dummy electrode area DMA, the vertices of the dummy electrode DM, that is, the vertices PP1 to PP4 of the rhombus are electrically connected to the vertices of the dummy electrodes DM (vertices of the rhombi) arranged in up, down, right and left directions. The vertices are connected with each other between the adjacent dummy electrodes DM. However, in each of the dummy electrodes DM, the vertices are electrically insulated from each other, and therefore, the dummy electrodes can be regarded as being electrically insulated from each other. Also in the dummy electrode area DMA, note that the electrode wiring arranged on the side is shared between the adjacent dummy electrodes.

In the border area EB1 shown in FIG. 12A, the vertex PP4 of the dummy electrode (FIG. 12C) and the vertex PP2 of the electrodes RD (FIG. 12B) forming the detection electrode RL(n) are connected to each other. Since the vertex PP4 of the dummy electrode is electrically insulated from the other vertices PP1 to PP3, the detection electrode RL(n) and the dummy electrode area DMA adjacent to this detection electrode are electrically insulated from each other.

Moreover, in the border area EB2, the electrode wirings LL1 and LL4 forming the electrode RD are divided as being electrode wirings LL1-1, LL1-2, LL4-1 and LL4-2 of the dummy electrode DM. In FIG. 12A, such an electrode is denoted by a reference character RDM. Thus, the detection electrodes RL(n) and RL(n+1) adjacent to each other are electrically insulated from each other. Moreover, also in the border area EB3, the above-described electrode RDM is arranged. Thus, the detection electrode RL(n+1) and the dummy electrode area DMA adjacent to this detection electrode are divided from each other.

The above explanation has exemplified the configuration in which the electrodes RD shown in FIG. 12B are arrayed in the areas of the detection electrodes RL(n) and RL(n+1), and in which the dummy electrodes DM are arrayed in the dummy electrode area DMA. However, the present invention is not limited to this configuration. For example, the detection electrodes RL(n), RL(n+1) and the dummy electrode area DMA may be formed by forming a plurality of metal thin wires intersecting each other on the first main surface CSF1 in a mesh form and cutting a part of the metal thin wires. In such a case, the example of the metal thin wires formed in the mesh form is shown as reference characters ML1 and ML2 in FIG. 12A. Moreover, the cut part is shown as a reference character CUT. The cut part CUT is formed in each of the metal thin wires ML1 and ML2 arranged in an area to be the dummy electrode area DMA. Similarly, also in each of the metal thin wires ML1 and ML2 arranged in an area to be the border areas EB1 to EB3, the cut part "CUT" is formed.

As an example for dividing the electrode wirings, the electrode wirings may be divided at the vertex. For example, when the adjacent electrodes RD are connected to each other by the vertices PP2 and PP4, the connection portion at which the vertex PP2 and the vertex PP4 are connected to each other may be divided from each other. However, in this case, the connection portion at which the vertex PP2 and the vertex PP4 are overlapped with each other is divided, and therefore, such inconvenience as increase in an amount of the division is considered. Therefore, it is desirable to divide the electrode wiring that is arranged along the side.

In the first embodiment, in each of the dummy electrodes DM, the vertices are electrically insulated from each other. For this reason, even when a magnetic field from the coil L1 is applied to the dummy electrode area DMA, the magnetic field can be prevented from being induced in the dummy electrode DM, so that the disturbance of the magnetic field from the coil L1 can be reduced.

In the first embodiment, note that the electrode wirings LL1 to LL4 (LL1-1, LL1-2 to LL4-1 and LL4-2) are made of aluminum having a low resistance value or others although not particularly limited.

In FIG. 12, explanation has been made while exemplifying the detection electrodes RL(n) and RL(n+1). However, other detection electrodes are also configured so as to have the same structure. For example, the detection electrode RL(n+2) arranged inside the magnetic-field detection coil DY(n) shown in FIG. 11 is also configured by polygonal electrodes RD that are arranged in column and line directions.

For example, in FIG. 11, each of the detection electrodes RL(n+1) and RL(n+3) forming the magnetic-field detection coil DY(n) may be regarded as the first electrode, and the detection electrode RL(n+2) arranged inside the magnetic-field detection coil may be regarded as the second electrode. Moreover, for example, in FIG. 12, each of polygonal electrodes RD forming the detection electrode RL(n+1) may be regarded as the third electrode, and each of polygonal electrodes RD forming the detection electrode RL(n+2) that is arranged inside the magnetic-field detection coil DY(n) may be regarded as the fourth electrode. In this case, the electrode wirings LL1 to LL4 forming the polygonal electrodes RD can be regarded as the first electrode wirings, and the electrode wirings LL1-1, LL1-2 to LL4-1, and LL4-2 forming the polygonal dummy electrodes can be regarded as the second electrode wirings.

Second Embodiment

Figures 13A, 13B:
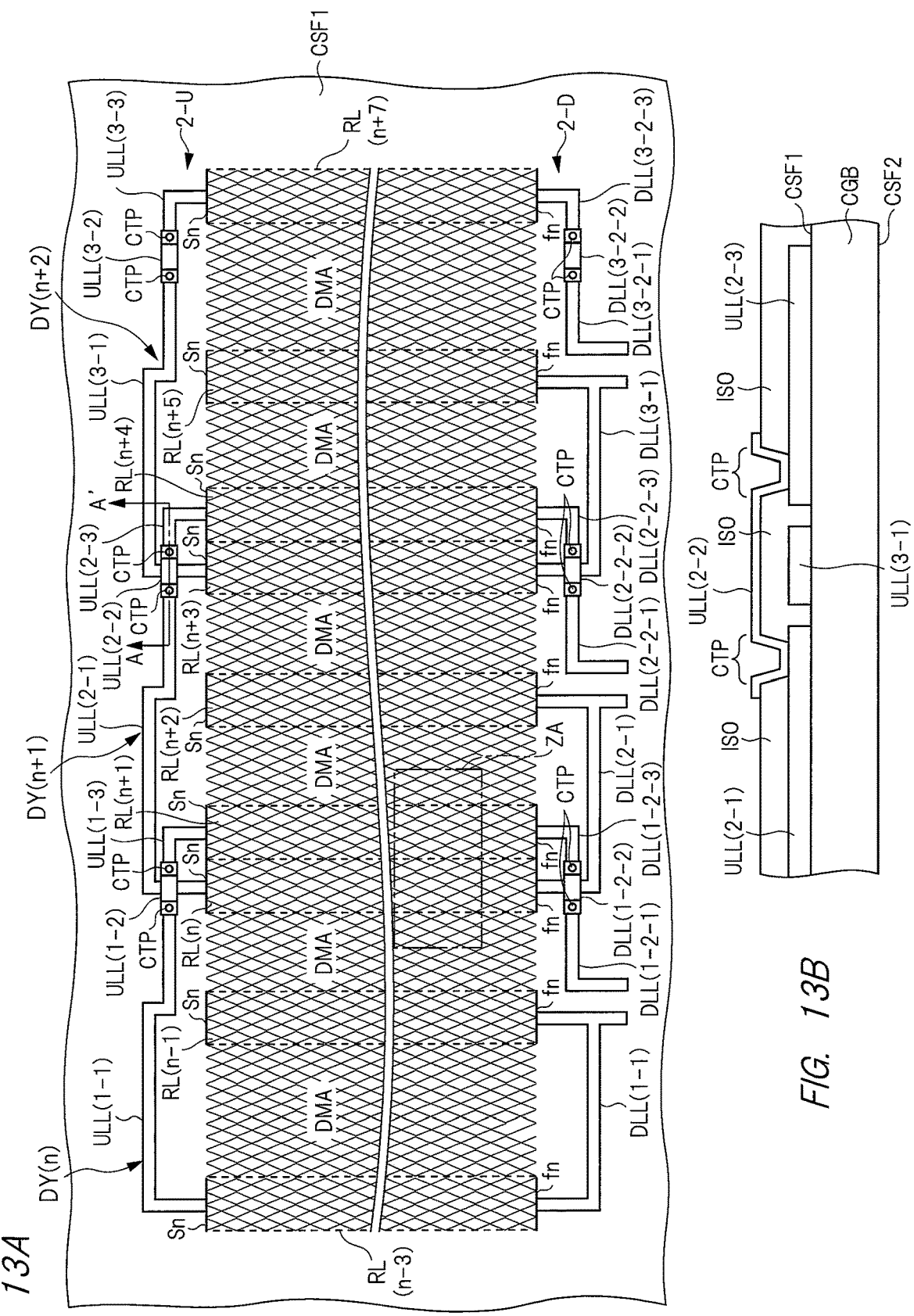
FIG. 13A and FIG. 13B are a plan view and a cross-sectional view showing a configuration of a detection electrode according to a second embodiment.

FIG. 13 is views showing a configuration of detection electrodes according to a second embodiment. FIG. 13A is a plan view of the detection electrode, and FIG. 13B is a cross-sectional view showing a cross section taken along a line A-A' in FIG. 13A.

In FIG. 13A, reference characters RL(n−3) to RL(n+7) indicate detection electrodes formed on the second substrate CGB as similar to FIG. 11. Each of the detection electrodes RL(n−3) to RL(n+7) is configured by a plurality of polygonal electrodes RD. Moreover, in FIG. 13A, a reference character DMA indicates a dummy electrode area where a plurality of polygonal dummy electrodes DM are arranged. In FIG. 13A, an area indicated by a one-dot chain line ZA corresponds to the area explained in FIG. 12A.

In FIG. 13A, reference characters ULL(1-1) to ULL(1-3), ULL(2-1) to ULL(2-3) and ULL(3-1) to ULL(3-3) indicate signal wirings. These signal wirings are formed to be closer to a side 2-U on the first main surface CSF1. Moreover, reference characters DLL(1-1), DLL(1-2-1) to DLL(1-2-3), DLL(2-1), DLL(2-2-1) to DLL(2-2-3), DLL(3-1) and DLL (3-2-1) to DLL(3-2-3) indicate signal wirings. These signal wirings are formed to be closer to a side 2-D on the first main surface CSF1.

By the signal wirings ULL(1-1) to ULL(1-3), the respective upper ends sn of the detection electrode RL(n−3) and the detection electrode RL(n+1) are connected to each other.

Moreover, by the signal wiring DLL(1-1), the respective lower ends fn of the detection electrodes RL(n−3) and RL(n−2) and the second terminal C2 of the sixth switch explained in FIG. 9 and FIG. 10 are connected to each other in a portion closer to the side 2-D. Furthermore, by the signal wirings DLL(1-2-1) and DLL(1-2-2), the lower end fn of the detection electrode RL(n+1) is connected to the common terminal P of the second switch in a portion closer to the side 2-D. The connections of the other detection electrodes are similar. Thus, the single-winding magnetic-field detection coil DY(n) is formed by the detection electrodes RL(n−3) and RL(n+1), the single-winding magnetic-field detection coil DY(n+1) is formed by the detection electrodes RL(n) and RL(n+4), and the single-winding magnetic-field detection coil DY(n+2) is formed by the detection electrodes RL(n+3) and RL(n+7).

In the second embodiment, three detection electrodes RL(n+1) to RL(n+3) are arranged between the detection electrodes (fifth electrodes) RL(n) and RL(n+4) forming the magnetic-field detection coil DY(n+1) in a plan view. That is, the three detection electrodes are arranged in an area inside the magnetic-field detection coil DY(n+1). Among these three detection electrodes RL(n+1) to RL(n+3), the detection electrode (first electrode) RL(n+1) adjacent to the detection electrode RL(n) is used as a detection electrode forming the magnetic-field detection coil DY(n) arranged on the left side of the magnetic-field detection coil DY(n+1). Similarly, the detection electrode RL(n+3) adjacent to the detection electrode RL(n+4) is used as a detection electrode forming the magnetic-field detection coil DY(n+2) arranged on the right side of the magnetic-field detection coil DY(n+1). Thus, the magnetic-field detection coil DY(n+1) is partially overlapped with the adjacent (next) magnetic-field detection coils DY(n) and DY(n+2), so that occurrence of an area that is insensitive at the time of detecting the magnetic field can be prevented.

One end fn of the remaining one detection electrode RL(n+2) among the three detection electrodes RL(n+1) to RL(n+3) is electrically connected to the detection electrodes RL(n) and RL(n+4) forming the magnetic-field detection coil DY(n+1), and the other end sn thereof is electrically insulated from the magnetic-field detection coil DY(n+1). At the time of detecting the electric field, the detection electrode RL(n+2) is used as an electrode for detecting an electric field together with the detection electrode RL(n) and RL(n+4), so that the lowering of the sensitivity at the time of detecting the electric field can be prevented.

Similarly, the magnetic-field detection coil DY(n) is arranged so as to be overlapped with the magnetic-field detection coil DY(n+1) and the magnetic-field detection coil DY(n−1) although not shown, and the magnetic-field detection coil DY(n+2) is arranged so as to be overlapped with the magnetic-field detection coil DY(n+1) and the magnetic-field detection coil DY(n+3) although not shown. Moreover, the detection electrodes RL(n−1) and RL(n+5) respectively arranged inside the magnetic-field detection coils DY(n) and DY(n+2) are used as electrodes for detecting the electric field. In FIG. 13A, note that the arrangement inside the magnetic-field detection coil means that the arrangement between the detection electrodes forming the magnetic-field detection coil in a plan view.

In the second embodiment, in order to form a part of each of the magnetic-field detection coils to be overlapped with each other, the signal wirings of the respective magnetic-field detection coils closer to the side 2-U are formed so as to three-dimensionally intersect with one another. Similarly, the signal wirings of the respective magnetic-field detection coils closer to the side 2-D are formed so as to three-dimensionally intersect with one another.

The example of this three-dimensionally intersected portion is shown as A-A' portion in FIG. 13A. A cross-sectional structure of the A-A' portion is shown in FIG. 13B. In FIG. 13B, on the first main surface CSF1, the above-described detection electrodes RL(0) to RL(P) are formed in an area corresponding to the display area 2. The signal wiring ULL(2-1) and signal wiring ULL(2-3) that extend in a horizontal direction in FIG. 13B are formed to be closer to the side 2-U on the first main surface CSF1 by a metal wiring layer formed thereon. Moreover, the signal wiring ULL(2-1) and the signal wiring ULL(2-3) are separated from each other, and the signal wiring ULL(3-1) made by the metal wiring layer formed on the first main surface CSF1 passes through the separated portion.

A resin film ISO is formed on the metal wiring layer formed on the first main surface CSF1. On the resin film ISO, a conductive layer having high transparency made of, for example, ITO, is formed. An opening is formed in a predetermined area of the resin film IOS formed on the signal wirings ULL(2-1) and ULL(2-3). Through the opening, the conductive layer having high transparency is connected to each of the signal wirings ULL(2-1) and ULL(2-3). The conductive layer connected to each of the signal wirings ULL(2-1) and ULL(2-3) forms the signal wiring ULL(2-2). In FIG. 13B, a part connecting the signal wirings ULL(2-1) and ULL(2-3) to the signal wiring ULL(2-2) is indicated as a contact hole CTP. Thus, the signal wiring ULL(3-1) and the signal wirings ULL(2-1) to ULL(2-3) intersect with one another so as not to be electrically connected with one another.

The explanation has been made while exemplifying the intersecting portion between the signal wiring ULL(3-1) and the signal wirings ULL(2-1) to ULL(2-3). However, the same goes for the intersecting portions among the other signal wirings.

According to the second embodiment, all the magnetic field detection areas formed by the electrode wirings forming the electrode RD or the dummy electrode DM exist in an area inside from the outer edge of any of the magnetic-field detection coils, so that the area where the detection sensitivity is lowered or occurrence of the insensitive area can be reduced at the time of the magnetic field detection. Moreover, at the time of the electric field detection, the lowering of the detection sensitivity can be reduced.

In the first embodiment, note that no magnetic-field detection coils are overlapped with each other, and therefore, for example, a one-layered conductive layer can be formed on the second substrate CGB, and the magnetic-field detection coil and the detection electrode inside the magnetic-field detection coil can be formed by using this conductive layer, so that cost increase can be suppressed.

Modified Example

Figure 14:
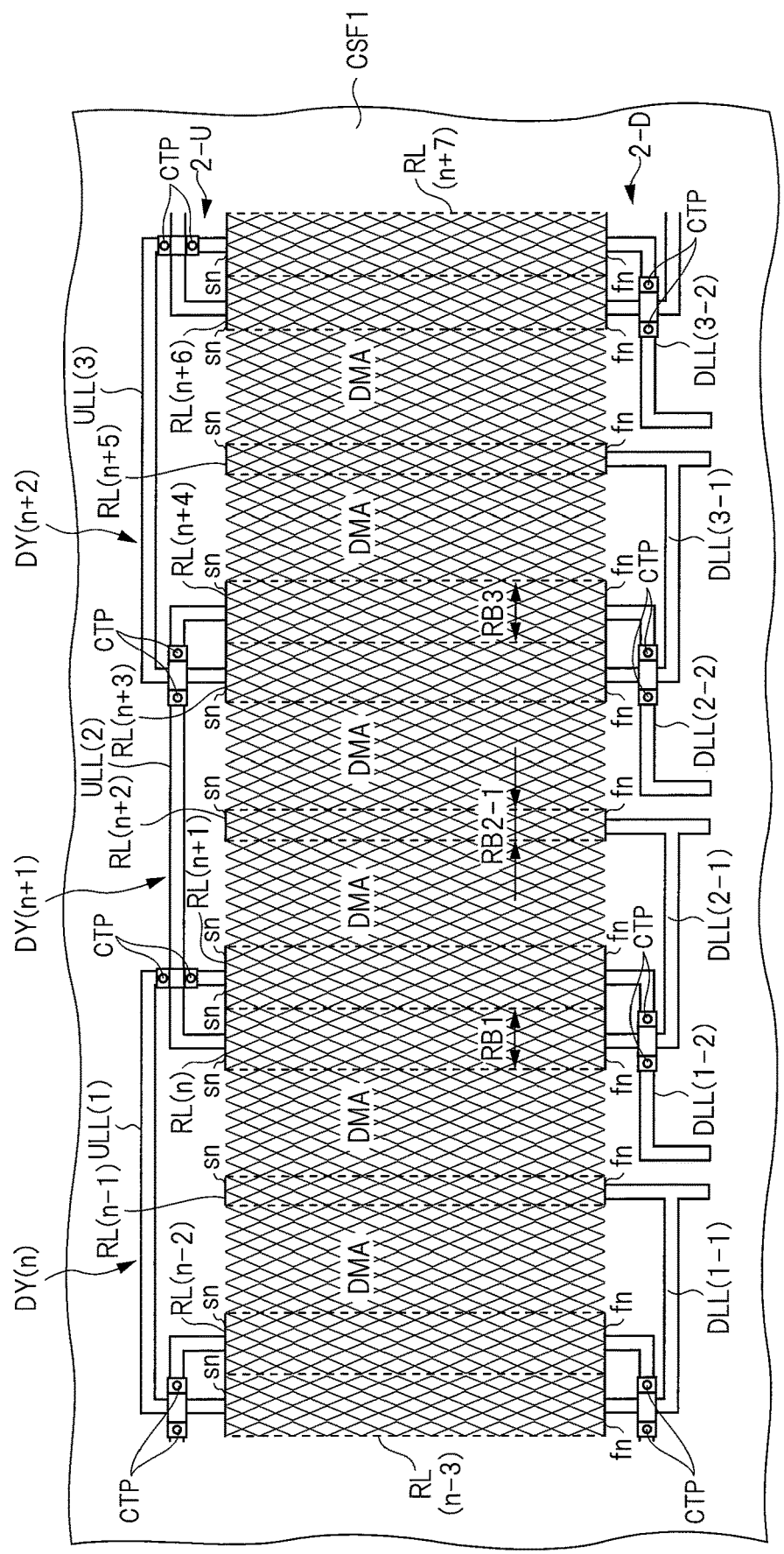
FIG. 14 is a plan view showing a configuration of a detection electrode according to a modified example of the second embodiment.

FIG. 14 is a plan view showing a structure of a detection electrode according to a modified example of the second embodiment. Since FIG. 14 is similar to FIG. 13A, differences will be mainly described.

As described in FIG. 13A, the magnetic-field detection coil DY(n+1) is configured by the detection electrodes RL(n) and RL(n+4). In a plan view, the detection electrodes RL(n+1) to RL(n+3) exist between the detection electrode RL(n) and RL(n+4). In FIG. 13A, the respective widths RB1 to RB3 of the detection electrodes RL(n+1) to RL(n+3) arranged inside the magnetic-field detection coil DY(n+1) are formed to be equal to one another. On the other hand, in the modified example, the width RB2-1 of the detection electrode RL(n+2) arranged inside the magnetic-field detection coil DY(n+1) is formed to be thinner than the widths RB1 and RB3 of the detection electrodes RL(n) and RL(n+4). That is, the width RB2-1 of the detection electrode RL(n+2) for use as an electrode for detecting an electric field at the time of electric field detection is thinned. Thus, it is possible to reduce the disturbance of the magnetic field to be transmitted from the coil L1 at the time of magnetic field detection due to the detection electrode arranged inside the magnetic-field detection coil DY(n+1), and it is possible to prevent the decrease in the magnetic field to be transmitted to the magnetic-field detection coil DY(n+1). As a result, the lowering of the detection sensitivity can be reduced. Moreover, since the width RB2-1 of the detection electrode arranged inside the magnetic-field detection coil is thinned, the parasitic capacitance caused in the detection electrode can be reduced, and a current that flows into the parasitic capacitance at the time of magnetic field detection can be reduced. As a result, the lowering of the detection sensitivity can be further reduced.

The explanation has been made while exemplifying the detection electrode RL(n+2) arranged inside the magnetic-field detection coil DY(n+1). However, the widths of the detection electrodes RL(n−1) and RL(n+5) that are respectively arranged inside the other magnetic-field detection coils DY(n) and DY(n+2) are also formed to be thinner than the width of the detection electrode forming the magnetic-field detection coil.

Third Embodiment

The first embodiment and the second embodiment have explained the display apparatus in which the signal lines SL(0) to SL(p) and the drive electrodes TL(0) to TL(p) are arranged so as to orthogonally intersect with each other in the display area 2. In the third embodiment, in the display area 2, the signal lines SL(0) to SL(p) and the drive electrodes TL(0) to TL(p) are arranged in parallel with each other. That is, the signal lines SL(0) to SL(p) and the drive electrodes TL(0) to TL(p) extend in the column direction (second direction), while the detection electrodes RL(0) to RL(p) extend in the row direction (first direction) so as to orthogonally intersect with the drive electrodes TL(0) to TL(p).

Also in the third embodiment, at the time of a magnetic field touch detection, the magnetic-field detection coil is configured by the drive electrodes TL(0) to TL(p) and a magnetic-field detection coil is configured by the detection electrodes RL(0) to RL(p), as similar to the first embodiment. Moreover, at the time of an electric field touch detection, an electric field is generated by the drive electrodes TL(0) to TL(p), and a change in the electric field is detected by the detection electrodes RL(0) to RL(p).

Figure 15:
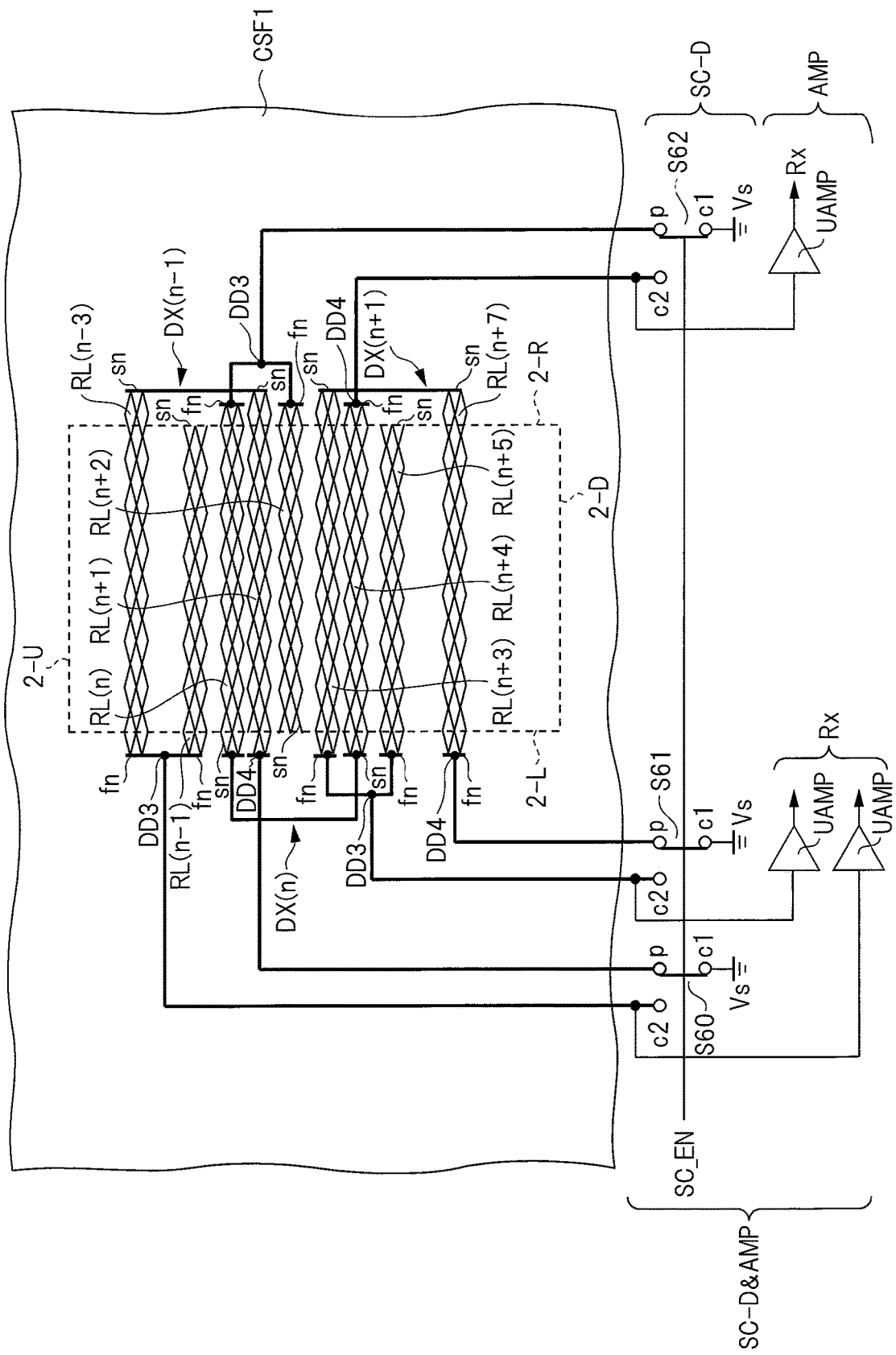
FIG. 15 is a plan view showing a configuration of a detection electrode according to a third embodiment.

FIG. 15 is a plan view schematically showing a structure of detection electrodes according to the third embodiment. The arrangement of the detection electrodes in the display area 2 is illustrated in accordance with the practical arrangement although it is schematically illustrated. In FIG. 15, an area surrounded by a broken line indicates the display area 2. A plurality of detection electrodes RL(0) to RL(p) are arranged in the display area 2. However, FIG. 15 shows only detection electrodes RL(n−3), RL(n−1) to RL(n+5) and RL(n+7).

The other end sn of the detection electrode RL(n−3) is connected to the other end sn of the detection electrode RL(n+1) in a portion closer to the side 2-R of the display area 2. Thus, a magnetic-field detection coil DX(n−1) is configured by the detection electrodes RL(n−3) and RL(n+1). Inside the magnetic-field detection coil DX(n−1), the detection electrodes RL(n−2), RL(n−1) and RL(n) are arranged. In FIG. 15, although the detection electrode RL(n−2) is omitted, it is used as a detection electrode forming an adjacent magnetic-field detection coil DX(n−2). One end fn of the detection electrode RL(n−1) is connected to one end fn of the detection electrode RL(n−3) in a portion closer to the side 2-L, and the other end sn thereof is electrically insulated from the magnetic-field detection coil DX(n−1). Moreover, the other end sn of the detection electrode RL(n) is connected to the other end sn of the detection electrode RL(n+4) in a portion closer to the side 2-L. Thus, the magnetic-field detection coil DX(n) is configured by the detection electrodes RL(n) and RL(n+4).

The magnetic-field detection coil DX(n) is arranged inside the magnetic-field detection coil DX(n−1) arranged in the upper direction, and therefore, is partially overlapped with the adjacent magnetic-field detection coil as similar to the explanation in the second embodiment.

Inside the magnetic-field detection coil DX(n), the detection electrodes RL(n+2), RL(n+3) and the above-described detection electrode RL(n+1) are arranged. One end fn of the detection electrode RL(n+2) is connected to one end fn of the detection electrode RL(n) in a portion closer to the side 2-R, and the other end sn thereof is electrically insulated from the magnetic-field detection coil DX(n). The other end sn of the detection electrode RL(n+3) is connected to the other end sn of the detection electrode RL(n+7) in a portion closer to the side 2-R, so that the magnetic-field detection coil DX(n+1) is configured. The configuration of the magnetic-field detection coil DX(n+1) is different in only the detection electrode from and similar to the magnetic-field detection coil DX(n−1).

Also in the third embodiment, as shown in FIG. 5, the side 2-L of the display area 2 is opposed to the side 500-L of the module 500, and the side 2-R of the display area 2 is opposed to the side 500-R of the module 500. A signal wiring is formed between the side 500-L of the module 500 and the side 2-L of the display area 2. Similarly, a signal wiring is formed also between the side 500-R of the module 500 and the side 2-R of the display area 2.

One end fn of each of the detection electrodes RL(n−3) and RL(n−1) is used as one end DD3 of the magnetic-field detection coil DX(n−1), and one end fn of the detection electrode RL(n+1) is used as the other end DD4 of the magnetic-field detection coil DX(n−1). The one end DD3 and the other end DD4 of the magnetic-field detection coil DX(n−1) are connected to the switching detection circuit SC-D& via a signal wiring formed in an area between the side 500-L and the side 2-L. Similarly, the one end DD3 and the other end DD4 of the magnetic-field detection coil DX(n+1) are also connected to the switching detection circuit SC-D& via the signal wiring formed in an area between the side 500-L and the side 2-L, and the one end DD3 and the other end DD4 of the magnetic-field detection coil DX(n) are connected to the switching detection circuit SC-D& via the signal wiring formed in an area between the side 500-R and the side 2-R.

The switching detection circuit SC-D& is provided with a switching circuit SC-D and a detection circuit AMP. The switching circuit SC-D is provided with seventh switches S60 to S62, and the detection circuit AMP is provided with unit detection circuits UAMP corresponding to the magnetic-field detection coils DX(n−1) to DX(n+1), respectively. Since the operations of the seventh switches S60 to S62 and the unit detection circuits UAMP are the same as those of the sixth switch S51 and the unit detection circuit UAMP explained in the first embodiment, explanations thereof will be omitted.

In the third embodiment, a signal change in the detection electrode is supplied to the unit detection circuits UAMP at the time of each of the magnetic field touch detection and the electric field touch detection by using the signal wiring formed in the area between the side 2-L of the display area 2 and the side 500-L of the module 500 and the signal wiring formed in the area between the side 2-R of the display area 2 and the side 500-R of the module 500. Therefore, increase in a size of a frame edge of the module 500 in a longitudinal direction can be prevented.

Fourth Embodiment

In FIG. 12, explanation has been made about the example of the usage of the use of the electrodes RD having the rhombic shape as electrodes forming the detection electrode. In the fourth embodiment, the detection electrode is formed by using an electrode whose outer shape is octagonal.

Figure 16A:
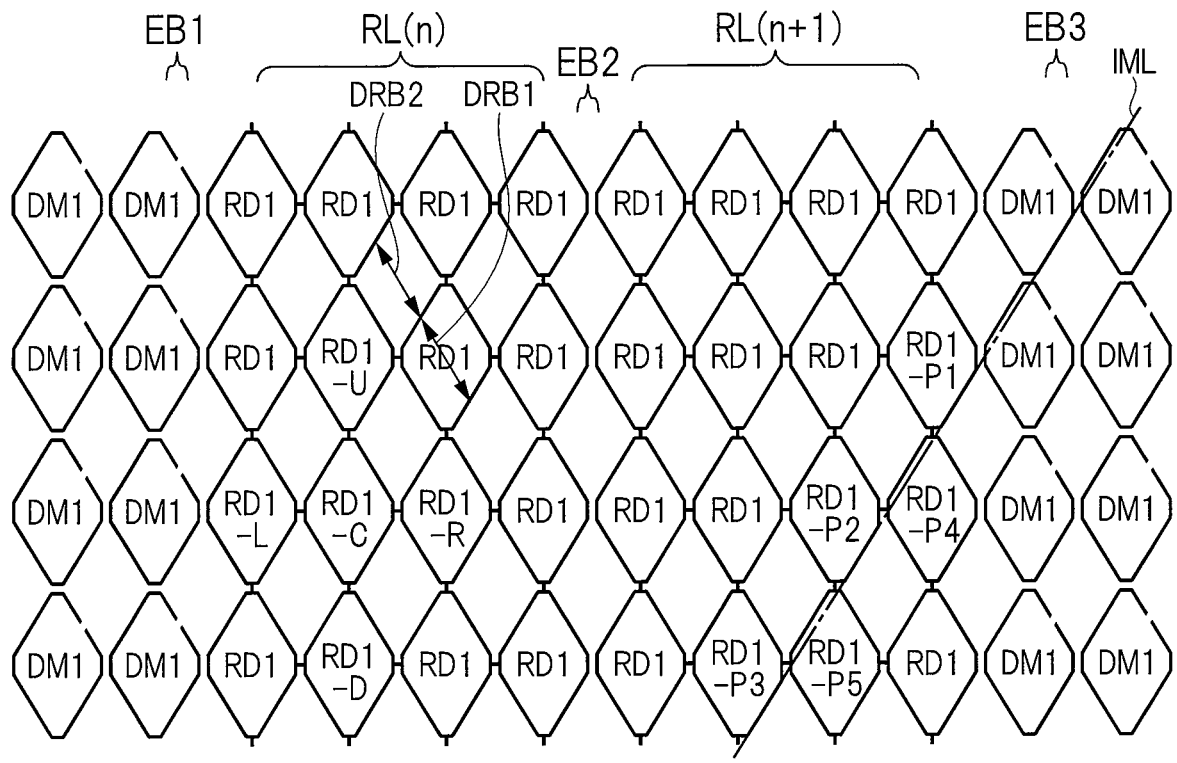
FIG. 16A to FIG. 16C are plan views showing a detection electrode and a dummy electrode area according to a fourth embodiment.
Figure 16B:
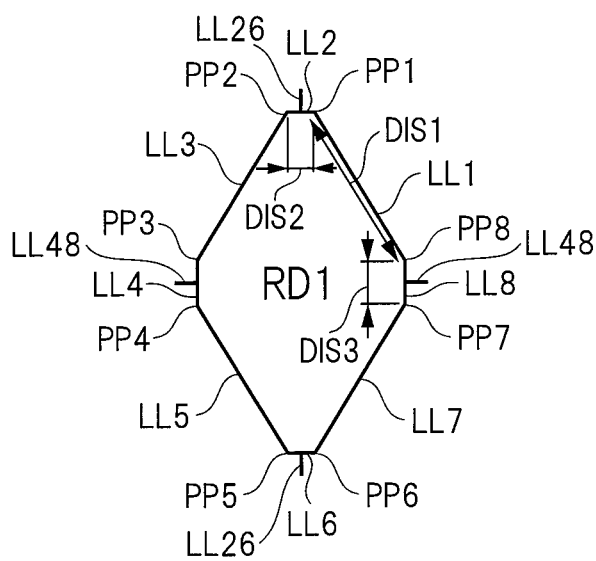
Figure 16C:
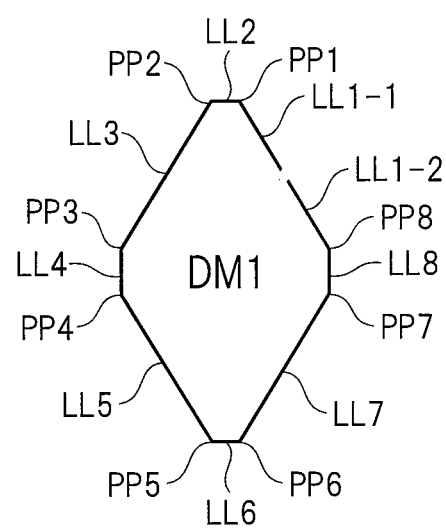

FIGS. 16A, 16B and 16C are plan views showing structures of detection electrodes according to the fourth embodiment. Here, FIG. 16A is a plan view enlarging an area ZA shown in FIG. 13A. Moreover, FIG. 16B is a plan view showing a structure of an electrode RD1 (third electrode) forming the detection electrode, and FIG. 16C is a plan view showing a structure of a dummy electrode DM1 arranged in a dummy electrode area DMA.

Each of detection electrodes RL(n) and RL(n+1) is arranged in a matrix form in a plan view, and is configured of a plurality electrodes RD1 electrically connected to each other. Moreover, in a plan view, in the dummy electrode area DMA, a plurality of dummy electrodes DM1 arranged in a matrix form are arranged. In the fourth embodiment, each of the electrodes RD1 has the same structure in a plan view, and each of the dummy electrodes DM1 also has the same structure in a plan view.

With reference to FIG. 16B, the electrode RD1 will be described. In the fourth embodiment, the electrode RD1 is provided with electrode wirings LL1 to LL8 arranged along the respective sides of the octagon, and the electrode wirings arranged along the sides adjacent to each other are electrically connected at respective vertices PP1 to PP8 at which the adjacent sides intersect with each other.

Here, the wiring lengths of the electrode wirings LL1, LL3, LL5 and LL7 are set to the same length DIS1 as one another, the wiring lengths of the electrode wirings LL2 and LL6 are set to the same length DIS2 as each other, and the wiring lengths of the electrode wirings LL4 and LL8 are set to the same length DIS3 as each other. The length DIS1 is longer than the lengths DIS2 and DIS3. The short electrode wirings LL2 and LL6 are opposed to each other, and arranged in parallel with each other. The short electrode wirings LL4 and LL8 are also opposed to each other, and arranged in parallel with each other. The long electrode wirings LL1, LL3, LL5 and LL7 are arranged so as to connect the short wirings LL8, LL2, LL4, LL6 and LL8. Moreover, the long electrode wirings LL1 and LL5 are opposed to each other, and arranged in parallel with each other. The long electrode wirings LL3 and LL7 are opposed to each other, and arranged in parallel with each other. Thus, as shown in FIG. 16B, the outer shape of the electrode RD1 formed by the electrode wirings LL1 to LL8 is formed into an octagonal shape as similar to the rhombic shape which has the long-length direction and the short-length direction as similar to those of the rhombic shape.

The long-length direction of each of the octagonal electrodes RD1 is arranged to be the extending direction of the detection electrodes RL(n) and RL(n+1). That is, the long-length direction of each of the electrodes RD1 is arranged to become the column direction (vertical direction), and the short-length direction thereof is arranged to become the row direction (horizontal direction). In other words, the plurality of electrodes RD1 are arranged so as to have a predetermined width in a direction orthogonally intersecting the extending direction of the detection electrodes RL(n) and RL(n+1) and so as to be in electrode areas (electrode areas) extending in the extending direction of the detection electrodes. Between the plurality of electrodes RD1 arranged on the detection electrodes, the electrode wirings LL1 to LL7 have the same length as each other. Therefore, the areas of the plurality of electrodes RD1 inside the electrodes RD1 are the same as each other.

In the detection electrodes RL(n) and RL(n+1), between the electrodes RD1 arranged in up, down, right, and left directions, the short electrode wirings are electrically connected with each other by a short inter-electrode wiring. When an electrode RD1-C shown in FIG. 16A is described as an example, the short electrode wiring LL2 of the electrode RD1-C is connected to the short electrode LL6 of an electrode RD-U arranged on the upper side by an inter-electrode wiring LL26. The short electrode wiring LL6 of the electrode RD1-C is connected to the short electrode LL2 of an electrode RD-D arranged on the lower side by an inter-electrode wiring LL26. Moreover, the short electrode wiring LL4 of the electrode RD1-C is connected to the short electrode wiring LL8 of an electrode RD-L arranged on the left side by an inter-electrode wiring LL48. The short electrode wiring LL8 of the electrode RD1-C is connected to the short electrode wiring LL4 of an electrode RD-R arranged on the right side by the inter-electrode wiring LL48. Thus, the plurality of electrodes RD1 arranged close to each other in a matrix form are connected to each other, so that the detection electrodes RL(n) and RL(n+1) are configured.

Moreover, in the border area EB2 between the detection electrodes RL(n) and RL(n+1), the electrode wirings LL4 and LL8 are not connected to but separated from each other by the inter-electrode wiring LL48.

The outer shape of each of the plurality of dummy electrodes DM1 arranged in a matrix form in the dummy electrode area DMA has an octagonal shape close to the rhombic shape as similar to the electrode RD1. As shown in FIG. 16C, the dummy electrode DM1 is provided with electrode wirings LL1 to LL8 arranged along the respective sides of the octagon, and the electrode wirings arranged along the sides intersecting each other are connected to each other at vertices PP1 to PP8 of the octagon. In the fourth embodiment, the electrode wiring LL1 arranged along the side connecting the vertices PP1 and PP8 is configured by two electrode wirings LL1-1 and LL1-2 electrically insulated from each other.

The dummy electrodes DM1 each having an opening area (space) are arranged in a matrix form in the dummy electrode area DMA. In this case, the long-length direction of each dummy electrode DM1 is arranged in a direction coincident with the long-length direction of the electrode RD1 and the short-length direction of each dummy electrode DM1 is arranged in a direction coincident with the short-length direction of the electrode RD1. The dummy electrodes DM1 arranged in the dummy electrode area DMA are not connected by inter-electrode wirings but separated from each other.

In the example shown in FIG. 12, in a plan view, the number of electrodes RD corresponding to each wiring width of the detection electrodes RL(n) and RL(n+1) is 3.5. On the other hand, in the fourth embodiment, the number of the electrodes RD1 can be set to four, so that the resistance of the detection electrodes can be reduced.

Moreover, in the fourth embodiment, the shape of the dummy electrode DM1 is substantially the same as the shape of the electrode RD1. For this reason, differences in optical performances such as reflectance can be made smaller between the detection electrodes RL(n), RL(n+1) and the dummy electrode area DMA. As a result, the display characteristics can be uniformed. Moreover, from the viewpoint of reducing the differences in optical performances, it is not required in the dummy electrode DM1 to divide the electrode wiring LL1 into the electrode wirings LL1-1 and LL1-2. That is, the dummy electrode DM1 may have the same configuration as the electrode RD1. In this case, the dummy electrodes DM1 arranged in the up and down direction and/or right and left direction are not connected to each other by the inter-electrode wiring but only required to be separated from each other.

Also in FIG. 16, the detection electrodes RL(n) and RL(n+1) has been explained as an example. However, the other detection electrodes also have the same structure. For example, the detection electrode RL(n+2) arranged inside the magnetic-field detection coil DY(n+1) shown in FIG. 12 is also configured by polygonal electrodes RD1 arranged in the column direction and row direction as similar to the detection electrodes RL(n) and RL(n+1). In other words, the plurality of electrodes RD1 are arranged so as to have a predetermined width in a direction orthogonally intersecting the extending direction of the detection electrodes RL(n+2) and so as to be in the electrode area (electrode area) extending in the extending direction of the detection electrodes RL(n+2), and the detection electrode RL(n+2) is also configured by the plurality of electrodes RD1 arranged in the second electrode area.

In the fourth embodiment, the electrodes RD1 have the electrode wiring having the same length as each other (for example, electrodes LL7 and LL3 having a length DIS1. However, each shape of the electrodes is octagon close to the rhombic shape. Therefore, when the two electrodes RD1 obliquely arranged next to each other are viewed, the electrode wirings are arranged in a slightly zig-zag form. For example, in FIG. 16A, when a virtual straight line IML (one-dot chain line) connecting the electrode wirings LL7 in the electrodes RD1-P1 to RD1-P3 is drawn, each electrode wiring LL3 of the electrodes RD1-P4 and RD1-P5 arranged on the right side of the electrodes RD1-P3 and RD1-P4 is not overlapped with the virtual straight line IML but protrudes toward the electrode RD1-P2 or RD1-P3. Moreover, in the electrode RD1, a width DRB1 between long electrode wirings (for example, LL3 and LL7) in parallel with each other has the same length between the electrodes RD1 arranged obliquely upward or downward as a width of a width DRB2 between long electrode wirings (LL3 and LL7) in parallel with each other. Here, the width DRB2 can be regarded as a width of a blank area located between the two obliquely-arranged electrodes RD1, that is, a width of an area where no electrodes RD1 are arranged.

In the first to fourth embodiments, the magnetic-field detection coil is configured by detection electrodes RL(0) to RL(p) formed on the first main surface CSF1 of the second substrate CGB. Since the detection electrode is formed on the first main surface CSF1 of the second substrate CGB, a parasitic capacitance caused in the detection electrodes RL(0) to RL(p) can be reduced. Thus, it is possible to suppress leakage of a current flowing from the magnetic-field detection coil to the detection electrode in the magnetic field detection due to the parasitic capacitance. As a result, the lowering of detection sensitivity can be reduced.

The above-described magnetic-field detection coil may be a one-and-half-(1.5 time)-winding, double-winding, or more-winding coil. Moreover, the number of the detection electrodes to be arranged inside the magnetic-field detection coil may be two or more. In the first to fourth embodiments, a plurality of electrodes (for example, RD in FIG. 12B) configuring the pair of detection electrodes can be regarded as an electrode segment having a polygonal shape. In a plan view, the plurality of electrode segments (RD) are arranged in the electrode area of the detection electrode so as to be continuously formed from one side of the electrode area to the other side, and the wiring configuring the detection electrode can be regarded as being formed of the continuously-formed electrode segments (RD). Similarly, a plurality of electrodes (for example, DM in FIG. 12C) configuring the dummy electrode can be regarded as a dummy electrode segment having a polygonal shape. Also in this case, in a plan view, the plurality of dummy electrode segments (DM) are arranged in the electrode area of the dummy electrode so as to be continuously formed from one side of the electrode area to the other side, and the wiring configuring the dummy electrode can be regarded as being formed of the continuously-formed electrode segments (DM). Further, when the electrodes (RD) are regarded as the electrode segment, the electrode wirings (for example, LL1 to LL4 in FIG. 12B) arranged along the side of the electrode segment (RD) can be regarded as an electrode segment wiring. Similarly, the electrode wirings (for example, LL1-1 to LL4-2 in FIG. 12C) arranged along the side of the dummy electrode segment (DM) can be also regarded as an electrode segment wiring.

Furthermore, the electrode to be arranged inside the magnetic-field detection coil may be configured by an electrode different from the detection electrode forming the magnetic-field detection coil. For example, the extending direction of the electrode to be arranged inside the magnetic-field detection coil formed on the first main surface CSF1 of the second substrate CGB may be different from the extending direction of the detection electrode forming the magnetic-field detection coil. Moreover, explanation has been made in the case in which the magnetic-field generation coil and the magnetic-field detection coil are different from each other. However, the magnetic-field generation coil and the magnetic-field detection coil may be the same as each other.

Within the scope of the concept of the present invention, various modified examples and alteration examples could have been easily thought up by those who skilled in the art, and it would be understood that these various modified examples and alteration examples belong to the scope of the present invention.

For example, the ones obtained by appropriate addition, removal, or design-change of the components to/from/into each of the above-described embodiments by those who skilled in the art or obtained by addition, omitting, or condition-change of the step to/from/into each of the above-described embodiments are also within the scope of the present invention as long as they include the concept of the present invention.

For example, the third embodiment has explained the case in which the drive electrodes TL(0) to TL(p) and the signal lines SL(0) to SL(p) extend in the column direction and are arranged in parallel with one another in the row direction. However, the row direction and the column direction are changed depending on the viewing point. By changing the viewing point, a case in which the drive electrodes TL(0) to TL(p) and the signal lines SL(0) to SL(p) extend in the row direction and are arranged in parallel with one another in the column direction is also included within the scope of the present invention. Moreover, the term "parallel" used in the present specification means that lines extend without intersecting with each other from one end to the other end. Therefore, even when one of the lines (or electrodes) partially or entirely tilts relative to the other line (or electrode), this state is also defined as "parallel" in the present specification as long as these lines do not intersect with each other from one end to the other end.

What is claimed is:

1. A display apparatus comprising:
   a pixel array including a plurality of pixels;
   a first coil and a second coil, each coil including a pair of first electrodes which are in parallel with each other in a first direction above the pixel array and a same side of an edge of which are electrically connected; and
   a detection circuit connected to one first electrode of the pair of first electrodes, wherein the first coil is arranged to partially overlap the second coil, wherein
   each coil has a second electrode,
   the second electrode extends parallel to the first electrodes in the first direction between the pair of first electrodes,
   the second electrode has a first end connected to one of the first electrodes and a second end having a gap to the first electrodes, and
   the second electrode has a thinner width than a width of the first electrode.

2. The display apparatus according to claim 1, wherein one of the pair of first electrodes of the second coil is located between the pair of the first electrodes of the first coil.

3. The display apparatus according to claim 1, further comprising:
   a drive electrode which extends in a second direction intersecting the first direction to intersect at least the first coil and the second coil,
   wherein, when a magnetic field from the external object is detected, a driving signal is supplied to the drive electrode to generate a magnetic field, and an induced voltage is generated at the first or second coil.

4. The display apparatus according to claim 3, further comprising:
   a first substrate having a first main surface on which the drive electrode is formed;
   a liquid crystal layer having optical characteristics that change in accordance with an electric potential; and
   a second substrate having a second main surface arranged to be opposed to the first main surface of the first substrate across the liquid crystal layer,
   wherein the first coil and the second coil are formed on a first main surface of the second substrate opposite to the second main surface.

5. A display apparatus comprising:
   a pixel array including a plurality of pixels;
   a first coil and a second coil, each coil including a pair of first electrodes which are in parallel with each other in a first direction above the pixel array and a same side of an edge of which are electrically connected; and
   a detection circuit connected to one first electrode of the pair of first electrodes, wherein the first coil is arranged to partially overlap the second coil, wherein
   in each coil, the pair of first electrodes have an electrode area which extends in the first direction and which has a predetermined width in a second direction intersecting the first direction in a plan view,
   in the electrode area, a plurality of first electrode segments are arranged to be electrically connected to each other, and
   each of the plurality of first electrode segments forms a closed octagonal area.

6. The display apparatus according to claim 5, wherein the first electrode segment has
   a plurality of short first electrode segment wirings which are arranged along four sides of the closed octagonal area and
   a plurality of long first electrode segment wirings which are arranged along four sides of the closed octagonal area and each of which is longer than the short first electrode segment wiring to form a closed area having an octagonal shape, and,
   in the electrode area, the short first electrode segment wiring arranged along one side of the first electrode segment is connected to the short first electrode segment wiring of another first electrode segment in the second direction by an inter-electrode wiring.

7. The display apparatus according to claim 5, further comprising
   a dummy electrode area which is arranged between at least the pair of first electrodes,
   wherein, in the dummy electrode area, a plurality of dummy electrode segments which are electrically insulated from each other are arranged, each of the plurality of dummy electrode segments forms a closed octagonal area that is the same shape of the first electrode segment.

8. The display apparatus according to claim 7, wherein the dummy electrode segment has a slit.

9. A display apparatus comprising:
   a pixel array including a plurality of pixels;
   a first coil and a second coil, each coil including a pair of first electrodes which are in parallel with each other in a first direction above the pixel array and a same side of an edge of which are electrically connected; and
   a detection circuit connected to one first electrode of the pair of first electrodes, wherein the first coil is arranged to partially overlap the second coil, wherein
   in the each coil, the pair of first electrodes have an electrode area which extends in the first direction and which has a predetermined width in a second direction intersecting the first direction in a plan view,
   in the electrode area, a plurality of first diagonal lines correspond to the first direction and a plurality of the second diagonal lines crossing the first diagonal lines are arranged,
   the first diagonal lines and the second diagonal lines form a plurality of closed rhombic areas.

10. The display apparatus according to claim 9, further comprising:
   a dummy electrode area which is arranged between at least the pair of first electrodes,
   wherein, in the dummy electrode area, a plurality of first dummy lines are arranged in parallel to the first diagonal lines and a plurality of the second dummy lines are arranged in parallel to the second diagonal lines, and
   wherein each dummy line has a slit.

* * * * *